(12) United States Patent
Bishnoi et al.

(10) Patent No.: US 9,418,113 B2
(45) Date of Patent: Aug. 16, 2016

(54) VALUE BASED WINDOWS ON RELATIONS IN CONTINUOUS DATA STREAMS

(71) Applicant: ORACLE INTERNATIONAL CORPORATION, Redwood Shores, CA (US)

(72) Inventors: Sandeep Bishnoi, Sirsa (IN); Anand Srinivasan, Bangalore (IN); Unmesh Anil Deshmukh, Sonegaon (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/906,162

(22) Filed: May 30, 2013

(65) Prior Publication Data

US 2014/0358959 A1    Dec. 4, 2014

(51) Int. Cl.
*G06F 17/30*      (2006.01)

(52) U.S. Cl.
CPC .............................. *G06F 17/30516* (2013.01)

(58) Field of Classification Search
USPC ................ 707/2, 3, 5; 702/190; 709/204–206
See application file for complete search history.

(56) References Cited

U.S. PATENT DOCUMENTS

| | | |
|---|---|---|
| 4,996,687 A | 2/1991 | Hess et al. |
| 5,051,947 A | 9/1991 | Messenger et al. |
| 5,339,392 A | 8/1994 | Risberg et al. |
| 5,495,600 A | 2/1996 | Terry et al. |
| 5,706,494 A | 1/1998 | Cochrane et al. |
| 5,802,262 A | 9/1998 | Van De Vanter |
| 5,802,523 A | 9/1998 | Jasuja et al. |
| 5,822,750 A | 10/1998 | Jou et al. |
| 5,826,077 A | 10/1998 | Blakeley et al. |
| 5,850,544 A | 12/1998 | Parvathaneny et al. |
| 5,857,182 A | 1/1999 | Demichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas et al. |
| 6,006,235 A | 12/1999 | Macdonald et al. |

(Continued)

FOREIGN PATENT DOCUMENTS

| | | |
|---|---|---|
| CN | 104885077 | 9/2015 |
| CN | 104937591 | 9/2015 |

(Continued)

OTHER PUBLICATIONS

U.S. Appl. No. 11/977,437, Notice of Allowance mailed on Jul. 10, 2013, 10 pages.

(Continued)

*Primary Examiner* — Etienne Leroux
(74) *Attorney, Agent, or Firm* — Kilpatrick Townsend and Stockton LLP

(57) ABSTRACT

Techniques for managing value-based windows on relations are provided. In some examples, an input relation is generated. The input relation is a bounded set of data records related to an application. A continuous query that identifies the input relation may be received. Additionally, a configurable window operator associated with processing the input relation may be identified. Then, the continuous query may be executed based at least in part on the configurable window operator to generate an output relation. Further, in some instances, the data records of the output relation may be provided based at least in part on execution of the continuous query.

17 Claims, 10 Drawing Sheets

(56) References Cited

U.S. PATENT DOCUMENTS

| | | |
|---|---|---|
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,212,673 B1 | 4/2001 | House et al. |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,985,904 B1 | 1/2006 | Kaluskar et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,348,981 B1 | 3/2008 | Buck |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |
| 7,634,501 B2 | 12/2009 | Yabloko |
| 7,636,703 B2 | 12/2009 | Taylor |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya |
| 7,844,829 B2 | 11/2010 | Meenakshisundaram |
| 7,870,124 B2 | 1/2011 | Liu et al. |
| 7,870,167 B2 | 1/2011 | Lu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | Maclennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,984,043 B1 | 7/2011 | Waas |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,122,006 B2 | 2/2012 | De Castro Alves et al. |
| 8,134,184 B2 | 3/2012 | Becker et al. |
| 8,145,686 B2 | 3/2012 | Raman et al. |
| 8,145,859 B2 | 3/2012 | Park et al. |
| 8,155,880 B2 | 4/2012 | Patel et al. |
| 8,195,648 B2 | 6/2012 | Zabback et al. |
| 8,204,873 B2 | 6/2012 | Chavan |
| 8,204,875 B2 | 6/2012 | Srinivasan et al. |
| 8,260,803 B2 | 9/2012 | Hsu et al. |
| 8,290,776 B2 | 10/2012 | Moriwaki et al. |
| 8,296,316 B2 | 10/2012 | Jain et al. |
| 8,307,343 B2 | 11/2012 | Chaudhuri et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,346,511 B2 | 1/2013 | Schoning et al. |
| 8,352,517 B2 | 1/2013 | Park et al. |
| 8,370,812 B2 | 2/2013 | Feblowitz et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,396,886 B1 | 3/2013 | Tsimelzon |
| 8,447,744 B2 | 5/2013 | Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,676,841 B2 | 3/2014 | Srinivasan et al. |
| 8,713,049 B2 | 4/2014 | Jain et al. |

(56) References Cited

U.S. PATENT DOCUMENTS

| | | |
|---|---|---|
| 8,719,207 B2 | 5/2014 | Ratnam et al. |
| 8,745,070 B2 | 6/2014 | Krishnamurthy |
| 8,762,369 B2 | 6/2014 | Macho et al. |
| 8,775,412 B2 | 7/2014 | Day et al. |
| 9,058,360 B2 | 6/2015 | De Castro Alves et al. |
| 9,098,587 B2 | 8/2015 | Deshmukh et al. |
| 9,110,945 B2 | 8/2015 | Jain |
| 9,189,280 B2 | 11/2015 | Park et al. |
| 9,244,978 B2 | 1/2016 | Alves et al. |
| 9,256,646 B2 | 2/2016 | Deshmukh et al. |
| 9,262,258 B2 | 2/2016 | Alves et al. |
| 9,262,479 B2 | 2/2016 | Deshmukh et al. |
| 2002/0023211 A1 | 2/2002 | Roth et al. |
| 2002/0032804 A1 | 3/2002 | Hunt |
| 2002/0038313 A1 | 3/2002 | Klein et al. |
| 2002/0049788 A1 | 4/2002 | Lipkin et al. |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0212664 A1 | 11/2003 | Breining et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0108368 A1 | 5/2005 | Mohan |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0167704 A1 | 7/2006 | Nicholls et al. |
| 2006/0167856 A1 | 7/2006 | Angele et al. |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | Von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0192301 A1 | 8/2007 | Posner |
| 2007/0198479 A1 | 8/2007 | Cai et al. |
| 2007/0214171 A1 | 9/2007 | Behnen et al. |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301086 A1 | 12/2008 | Gupta |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | C N et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |

(56) References Cited

U.S. PATENT DOCUMENTS

| | | |
|---|---|---|
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun et al. |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1* | 9/2009 | Wixson et al. ............... 715/723 |
| 2009/0228431 A1 | 9/2009 | Dunagan et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennet et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo et al. |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0023498 A1 | 1/2010 | Dettinger et al. |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106710 A1 | 4/2010 | Nishizawa |
| 2010/0106946 A1 | 4/2010 | Imaki et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1 | 9/2010 | Chen |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0040746 A1 | 2/2011 | Handa et al. |
| 2011/0055192 A1 | 3/2011 | Tang et al. |
| 2011/0055197 A1 | 3/2011 | Chavan |
| 2011/0093162 A1 | 4/2011 | Nielsen et al. |
| 2011/0105857 A1 | 5/2011 | Zhang et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0178775 A1* | 7/2011 | Schoning et al. ............. 702/190 |
| 2011/0196839 A1 | 8/2011 | Smith et al. |
| 2011/0196891 A1 | 8/2011 | De Castro et al. |
| 2011/0246445 A1* | 10/2011 | Mishra .............. G06F 17/30545 707/713 |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0072455 A1 | 3/2012 | Jain et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0262399 A1 | 10/2013 | Eker et al. |
| 2013/0332240 A1 | 12/2013 | Patri et al. |
| 2014/0082013 A1 | 3/2014 | Wolf et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |
| 2014/0379712 A1 | 12/2014 | Lafuente Alvarez |
| 2015/0156241 A1 | 6/2015 | Shukla et al. |
| 2015/0161214 A1 | 6/2015 | Kali et al. |
| 2015/0227415 A1 | 8/2015 | Alves et al. |

(56) References Cited

U.S. PATENT DOCUMENTS

| | | |
|---|---|---|
| 2015/0363464 A1 | 12/2015 | Alves et al. |
| 2015/0381712 A1 | 12/2015 | De Castro Alves et al. |
| 2016/0034311 A1 | 2/2016 | Park et al. |

FOREIGN PATENT DOCUMENTS

| | | |
|---|---|---|
| EP | 1241589 | 9/2002 |
| EP | 2474922 | 7/2012 |
| EP | 2946314 | 11/2015 |
| EP | 2946527 | 11/2015 |
| EP | 2959408 | 12/2015 |
| JP | 2002-251233 A | 9/2002 |
| JP | 2007-328716 A | 12/2007 |
| JP | 2008-541225 A | 11/2008 |
| JP | 2009-134689 A | 6/2009 |
| JP | 2010-108073 A | 5/2010 |
| JP | 2011-039818 A | 2/2011 |
| JP | 2015536001 | 12/2015 |
| JP | 2016500167 | 1/2016 |
| WO | 0049533 | 8/2000 |
| WO | WO00/49533 | 8/2000 |
| WO | 0118712 | 3/2001 |
| WO | 0159602 | 8/2001 |
| WO | 0165418 | 9/2001 |
| WO | 03030031 | 4/2003 |
| WO | 2007122347 | 11/2007 |
| WO | WO2009/119811 A1 | 10/2009 |
| WO | 2012037511 | 3/2012 |
| WO | 2012050582 | 4/2012 |
| WO | 2012154408 | 11/2012 |
| WO | 2012158360 | 11/2012 |
| WO | 2015191120 | 12/2015 |

OTHER PUBLICATIONS

U.S. Appl. No. 12/548,281, Final Office Action mailed on Oct. 10, 2013, 21 pages.
U.S. Appl. No. 12/548,290, Notice of Allowance mailed on Sep. 11, 2013, 6 pages.
U.S. Appl. No. 13/193,377, Notice of Allowance mailed on Aug. 30, 2013, 19 pages.
Oracle™ Fusion Middleware CQL Language Reference, 11g Release 1 (11.1.1.6.3) E12048-10, Aug. 2012, pp. 6-1 to 6-12.
Oracle™ Complex Event Processing CQL Language Reference, 11g Release 1 (11.1.1.4.0) E12048-04, Jan. 2011, pp. pp. 6.1 to 6.12.
Oracle™ Complex Event Processing CQL Language Reference, 11g Release 1 (11.1.1) E12048-03, Apr. 2010, sections 18-4 to 18.4.2.
Pattern Recognition With MATCH_RECOGNIZE, Oracle™ Complex Event Processing CQL Language Reference, 11g Release 1 (11.1.1) E12048-03, May 2009, pp. 15.1 to 15.20.
Supply Chain Event Management: Real-Time Supply Chain Event Management, product information Manhattan Associates, 2009-2012.
U.S. Appl. No. 11/601,415, Non-Final Office mailed on Dec. 11, 2013, 58 pages.
U.S. Appl. No. 12/396,464, Non Final Office Action mailed on Dec. 31, 2013, 16 pages.
U.S. Appl. No. 13/089,556, Non-Final Office Action mailed on Jan. 9, 2014, 14 pages.
Non-Final Office Action for U.S. Appl. No. 12/548,187 dated Feb. 6, 2014, 53 pages.
Agrawal et al. "Efficient pattern matching over event streams," Proceedings of the 2008 ACM SIGMOD international conference on Management of data, pp. 147-160 (Jun. 2008).
Arasu et al., An Abstract Semantics and Concrete Language for Continuous Queries over Streams and Relations, 9th International Workshop on Database programming languages, Sep. 2003, 12 pages.
Chandramouli et al., High-Performance Dynamic Pattern Matching over Disordered Streams, Proceedings of the VLDB Endowment, vol. 3 Issue 1-2, Sep. 2010, pp. 220-231.
Chapple "Combining Query Results with the UNION Command," ask.com Computing Databases, downloaded from: http://databases.about.com/od/sql/a/union.htm (no date, printed on Oct. 14, 2013).
Chui, WebSphere Application Server V6.1—Class loader problem determination, IBM.com, 2007.
Fantozzi, A Strategic Approach to Supply Chain Event Management, student submission for Masters Degree, Massachusetts Institute of Technology, Jun. 2003.
Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.
Ogrodnek, Custom UDFs and hive, Bizo development blog http://dev.bizo.com, Jun. 23, 2009, 2 pages.
Pradhan, Implementing and Configuring SAP® Event Management, Galileo Press, 2010, pp. 17-21.
Wilson et al., SAP Event Management, an Overview, Q Data USA, Inc., 2009.
U.S. Appl. No. 13/838,259, filed Mar. 15, 2013, Unpublished, Bishnoi et al.
U.S. Appl. No. 13/839,288, filed Mar. 15, 2013, Unpublished, Bishnoi et al.
Call User Defined Functions from Pig, Amazon Elastic MapReduce, Mar. 2009, 2 pages.
Strings in C, retrieved from the internet: <URL: https://web.archive.org/web/20070612231205/http:l/web.cs.swarthmore.edu/-newhall/unixhelp/C_strings.html> [retrieved on May 13, 2014], Swarthmore College, Jun. 12, 2007, 3 pages.
U.S. Appl. No. 11/874,197, Notice of Allowance mailed on Jun. 22, 2012, 20 pages.
U.S. Appl. No. 12/396,464, Final Office Action mailed on May 16, 2014, 16 pages.
U.S. Appl. No. 12/548,187, Final Office Action mailed on Jun. 4, 2014, 64 pages.
U.S. Appl. No. 13/089,556, Final Office Action mailed on Jun. 13, 2014, 14 pages.
U.S. Appl. No. 13/107,742, Non-Final Office Action mailed on Jun. 19, 2014, 20 pages.
U.S. Appl. No. 13/244,272, Notice of Allowance mailed on Aug. 12, 2013, 12 pages.
International Application No. PCT/US2011/052019, International Preliminary Report on Patentability mailed on Mar. 28, 2013, 6 pages.
International Application No. PCT/US2012/034970, International Preliminary Report on Patentability mailed on Nov. 21, 2013, 7 pages.
International Application No. PCT/US2012/036353, International Preliminary Report on Patentability mailed on Nov. 28, 2013, 6 pages.
Bottom-up parsing, Wikipedia, downloaded from: http://en.wikipedia.org/wiki/Bottom-up_parsing, Sep. 8, 2014, pp. 1-2.
Branch Predication, Wikipedia, downloaded from: http://en.wikipedia.org/wiki/Branch_predication, Sep. 8, 2014, pp. 1-4.
Microsoft Computer Dictionary, 5th Edition, Microsoft Press, Redmond, WA, ©, 2002, pp. 238-239 and 529.
Notice of Allowance for U.S. Appl. No. 13/089,556 dated Oct. 6, 2014, 9 pages.
U.S. Appl. No. 12/396,464, Notice of Allowance mailed on Sep. 3, 2014, 7 pages.
U.S. Appl. No. 12/548,187, Advisory Action mailed on Sep. 26, 2014, 6 pages.
U.S. Appl. No. 12/548,281, Final Office Action mailed on Aug. 13, 2014, 19 pages.
U.S. Appl. No. 12/913,636, Non-Final Office Action mailed on Jul. 24, 2014, 22 pages.
U.S. Appl. No. 12/957,201, Non-Final Office Action mailed on Jul. 30, 2014, 12 pages.
U.S. Appl. No. 13/764,560, Non Final Office Action mailed on Sep. 12, 2014, 23 pages.
U.S. Appl. No. 13/770,969, Non Final Office Action mailed on Aug. 7, 2014, 9 pages.
U.S. Appl. No. 14/302,031, Non-Final Office Action mailed on Aug. 27, 2014, 19 pages.

(56) References Cited

OTHER PUBLICATIONS

Abadi et al., Aurora: a new model and architecture for data stream management, the VLDB Journal the International Journal on very large data bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, The VLDB Journal, The International Journal on very large data bases, vol. 12, No. 2, Aug. 1, 2003, pp. 140-156.
Dewson, Beginning SOL Server 2008 for Developers: From Novice to Professional, A Press, Berkeley, CA, 2008, pp. 337-349 and 418-438.
Harish et al., Identifying robust plans through plan diagram reduction, PVLDB '08, Auckland, New Zealand, Aug. 23-28, 2008, pp. 1124-1140.
Krämer, Continuous Queries Over Data Streams—Semantics and Implementation, Fachbereich Mathematik und Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion mailed Jul. 16, 2014, 12 pages.
International Application No. PCT/US2013/062050, International Search Report & Written Opinion mailed on Jul. 2, 2014, 13 pages.
International Application No. PCT/US2013/062052, International Search Report & Written Opinion mailed on Jul. 3, 2014, 12 pages.
International Application No. PCT/US2013/073086, International Search Report and Written Opinion mailed on Mar. 14, 2014.
International Application No. PCT/US2014/017061, International Search Report mailed on Sep. 9, 2014, 4 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)~2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., LEO—DB2's LEarning Optimizer, Proc. of the VLDB, Roma, Italy, Sep. 2001, pp. 19-28.
Oracle Application Server, Enterprise Deployment Guide, 10g Release 3 (10.1.3.2.0), B32125-02, Oracle, Apr. 2007, 120 pages.
Oracle Database, SQL Language Reference 11 g Release 1 (11.1), B28286-02, Oracle, Sep. 2007, 1496 pages.
Esper Reference Documentation, Copyright 2007, Ver. 1.12.0, 2007, 158 pages.
Stream Query Repository: Online Auctions, Retrieved from URL: http://www.db.stanford.edu/stream/sqr/onauc.html#queryspecsend, Dec. 2, 2002, 2 pages.
Esper Reference Documentation, Copyright 2008, ver. 2.0.0, 2008, 202 pages.
Oracle Database Data Cartridge Developer's Guide, B28425-03, 11 g Release 1 (11.1), Oracle, Mar. 2008, 372 pages.
Oracle Application Server, Administrator's Guide, 10g Release 3 (10.1.3.2.0), B32196-01, Oracle, Jan. 2007, 376 pages.
Oracle Application Server 10g, Release 2 and 3, New Features Overview, An Oracle White Paper, Oracle, Oct. 2005, 48 pages.
Oracle Database, SQL Reference, 10g Release 1 (10.1), Part No. B10759-01, Dec. 2003, pp. 7-1 to 7-17; 7-287 to 7-290; 14-61 to 14-74.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
Complex Event Processing in the Real World, An Oracle White Paper, Sep. 2007, 13 pages.
Coral8 Complex Event Processing Technology Overview, Coral8, Inc., Make it Continuous, Copyright 2007 Coral8, Inc., 2007, 1-8 pages.
Creating WebLogic Domains Using the Configuration Wizard, BEA Products, Version 10.0, Dec. 2007, 78 pages.
Creating Weblogic Event Server Applications, BEA WebLogic Event Server, Version. 2.0, Jul. 2007, 90 pages.
Dependency Injection, Dec. 30, 2008, pp. 1-7.
Deploying Applications to WebLogic Server, Mar. 30, 2007, 164 pages.
Developing Applications with Weblogic Server, Mar. 30, 2007, 254 pages.
EPL Reference, Jul. 2007, 82 pages.
Esper Reference Documentation Version 3.1.0, EsperTech, retrieved from internet at URL: http://esper.codehaus.org/esper-3.1.0/doc/reference/en/pdf/esper_reference.pdf, 2009, 293 pages.
Fast Track Deployment and Administrator Guide for BEA WebLogic Server, BEA WebLogic Server 10.0 Documentation, printed on May 10, 2010, at URL: http://download.oracle.com/docs/cd/E1322201/wls/docs100/quickstart/quick_start.html, May 10, 2010, 1 page.
Getting Started with WebLogic Event Server, BEA WebLogic Event Server version 2.0, Jul. 2007, 66 pages.
High Availability Guide, Oracle Application Server, 10g Release 3 (10.1.3.2.0), B32201-01, Jan. 2007, 314 pages.
Installing Weblogic Real Time, BEA WebLogic Real Time, Ver. 2.0, Jul. 2007, 64 pages.
Introduction to BEA WebLogic Server and BEA WebLogic Express, BEA WebLogic Server, Ver. 10.0, Mar. 2007, 34 pages.
Introduction to WebLogic Real Time, Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Managing Server Startup and Shutdown, BEA WebLogic Server, version 10.0, Mar. 30, 2007, 134 pages.
Matching Behavior, NET Framework Developer's Guide, Microsoft Corporation, Retrieved on: Jul. 1, 2008, URL: http://msdn.microsoft.com/en-us/library/Oyzc2ybO (printer) aspx, 2008, pp. 1-2.
New Project Proposal for Row Pattern Recognition—Amendment to SQL with Application to Streaming Data Queries, H2-2008-027, H2 Teleconference Meeting, Jan. 9, 2008, pp. 1-6.
Oracle CEP Getting Started, Release 11 gR1 (11.1.1) E14476-01, May 2009, 172 pages.
Oracle Complex Event Processing CQL Language Reference, 1g Release 1 (11.1.1) E12048-01, Apr. 2010, 540 pages.
OSGI Service Platform Core Specification, The OSGI Alliance, OSGI Alliance, Apr. 2007, 288 pages.
Release Notes, BEA WebLogic Event Server, Ver. 2.0, Jul. 2007, 8 pages.
SQL Tutorial-In, Tizag.com, http://web.archive.org/web/20090216215219/http://www.tizag.com/sgiTutorial/sqlin.php, Feb. 16, 2009, pp. 1-3.
Spring Dynamic Modules for OSGi Service Platforms product documentation, Jan. 2008, 71 pages.
Stream Base New and Noteworthy, Stream Base, Jan. 12, 2010, 878 pages.
Stream: The Stanford Stream Data Manager, Retrieved from: URL: http://infolab.stanford.edu/stream/, Jan. 5, 2006, pp. 1-9.
The Stanford Stream Data Manager, IEEE Data Engineering Bulletin, Mar. 2003, pp. 1-8.
Understanding Domain Configuration, BEA WebLogic Server, Ver. 10.0, Mar. 30, 2007, 38 pages.
WebLogic Event Server Administration and Configuration Guide, BEA WebLogic Event D Server, Version. 2.0, Jul. 2007, 108 pages.
WebLogic Event Server Reference, BEA WebLogic Event Server, Version. 2.0, Jul. 2007, 52 pages.
Weblogic Server Performance and Tuning, BEA WebLogic Server, Ver. 10.0, Mar. 30, 2007, 180 pages.
WebSphere Application Server V6.1 Problem Determination: IBM Redpaper Collection, Dec. 2007, 634 pages.
What is BPM?, Datasheet [online]. IBM, [retrieved on Jan. 28, 2013]. Retrieved from the Internet: <URL: http://www-01.ibm.com/software/info/bpm/whatis-bpm/>.

(56) References Cited

OTHER PUBLICATIONS

U.S. Appl. No. 10/948,523, Final Office Action mailed on Jul. 6, 2007, 37 pages.
U.S. Appl. No. 10/948,523, Non-Final Office Action mailed on Dec. 11, 2007, 48 pages.
U.S. Appl. No. 10/948,523, Notice of Allowance mailed on Dec. 1, 2010, 17 pages.
U.S. Appl. No. 10/948,523, Notice of Allowance mailed on Jul. 8, 2008, 28 pages.
U.S. Appl. No. 10/948,523, Non-Final Office Action mailed on Jan. 22, 2007, 32 pages.
U.S. Appl. No. 10/948,523, Supplemental Notice of Allowance mailed on Jul. 17, 2008, 17 pages.
U.S. Appl. No. 10/948,523, Supplemental Notice of Allowance, mailed on Aug. 25, 2008, 3 pages.
U.S. Appl. No. 11/601,415, Advisory Action mailed on Aug. 18, 2009, 3 pages.
U.S. Appl. No. 11/601,415, Final Office Action mailed on May 27, 2009, 27 pages.
U.S. Appl. No. 11/601,415, Final Office Action mailed on Jul. 2, 2012, 59 pages.
U.S. Appl. No. 11/601,415, Final Office Action mailed on Jun. 30, 2010, 45 pages.
U.S. Appl. No. 11/601,415, Non-Final Office Action mailed on Sep. 17, 2008, 10 pages.
U.S. Appl. No. 11/601,415, Non-Final Office Action mailed on Nov. 30, 2009, 32 pages.
U.S. Appl. No. 11/601,415, Non-Final Office Action mailed on Dec. 9, 2011.
U.S. Appl. No. 11/873,407, Final Office Action mailed on Apr. 26, 2010, 11 pages.
U.S. Appl. No. 11/873,407, Non-Final Office Action mailed on Nov. 13, 2009, 7 pages.
U.S. Appl. No. 11/873,407, Notice of Allowance mailed on Nov. 10, 2010, 14 pages.
U.S. Appl. No. 11/873,407, Notice of Allowance mailed on Mar. 7, 2011, 8 pages.
U.S. Appl. No. 11/874,197, Final Office Action mailed on Aug. 12, 2011, 26 pages.
U.S. Appl. No. 11/874,197, Final Office Action mailed on Jun. 29, 2010, 17 pages.
U.S. Appl. No. 11/874,197, Non-Final Office Action mailed on Dec. 22, 2010, 22 pages.
U.S. Appl. No. 11/874,197, Non-Final Office Action mailed on Nov. 10, 2009, 14 pages.
U.S. Appl. No. 11/874,202, Final Office Action mailed on Jun. 8, 2010, 200 pages.
U.S. Appl. No. 11/874,202, Non-Final Office Action mailed on Dec. 3, 2009, 20 pages.
U.S. Appl. No. 11/874,202, Notice of Allowance mailed on Mar. 31, 2011, 12 pages.
U.S. Appl. No. 11/874,202, Notice of Allowance mailed on Dec. 22, 2010, 29 pages.
U.S. Appl. No. 11/874,850, Notice of Allowance mailed on Jan. 27, 2010, 11 pages.
U.S. Appl. No. 11/874,850, Notice of Allowance mailed on Nov. 24, 2009, 17 pages.
U.S. Appl. No. 11/874,850, Notice of Allowance mailed on Dec. 11, 2009, 5 pages.
U.S. Appl. No. 11/874,896, Final Office Action mailed on Jul. 23, 2010, 28 pages.
U.S. Appl. No. 11/874,896, Non-Final Office Action mailed on Dec. 8, 2009, 19 pages.
U.S. Appl. No. 11/874,896, Non-Final Office Action mailed on Nov. 22, 2010, 25 pages.
U.S. Appl. No. 11/874,896, Notice of Allowance mailed on Jun. 23, 2011, 30 pages.
U.S. Appl. No. 11/927,681, Non-Final Office Action mailed on Mar. 24, 2011, 17 pages.
U.S. Appl. No. 11/927,681, Notice of Allowance mailed on Jul. 1, 2011, 8 pages.
U.S. Appl. No. 11/927,683, Final Office Action mailed on Sep. 1, 2011, 18 pages.
U.S. Appl. No. 11/927,683, Non-Final Office Action mailed on Mar. 24, 2011, 13 pages.
U.S. Appl. No. 11/927,683, Notice of Allowance mailed on Nov. 9, 2011, 10 pages.
U.S. Appl. No. 11/977,437, Final Office Action mailed on Apr. 8, 2010, 18 pages.
U.S. Appl. No. 11/977,437, Non-Final Office Action mailed on Oct. 13, 2009, 9 pages.
U.S. Appl. No. 11/977,437, Notice of Allowance mailed on Mar. 4, 2013, 9 pages.
U.S. Appl. No. 11/977,437, Non-Final Office Action mailed on Aug. 3, 2012.
U.S. Appl. No. 11/977,439, Non-Final Office Action mailed on Apr. 13, 2010, 7 pages.
U.S. Appl. No. 11/977,439, Notice of Allowance mailed on Mar. 16, 2011, 10 pages.
U.S. Appl. No. 11/977,439, Notice of Allowance mailed on Aug. 18, 2010, 11 pages.
U.S. Appl. No. 11/977,439, Notice of Allowance mailed on Sep. 28, 2010, 6 pages.
U.S. Appl. No. 11/977,439, Notice of Allowance mailed on Nov. 24, 2010, 8 pages.
U.S. Appl. No. 11/977,440, Notice of Allowance mailed on Oct. 7, 2009, 6 pages.
U.S. Appl. No. 12/193,377, Final Office Action mailed on Jan. 17, 2013, 24 pages.
U.S. Appl. No. 12/395,871, Non-Final Office Action mailed on May 27, 2011, 7 pages.
U.S. Appl. No. 12/395,871, Notice of Allowance mailed on May 4, 2012, 27 pages.
U.S. Appl. No. 12/395,871, Final Office Action mailed on Oct. 19, 2011, 33 pages.
U.S. Appl. No. 12/396,008, Non-Final Office Action mailed on Jun. 8, 2011, 10 pages.
U.S. Appl. No. 12/396,008, Notice of Allowance mailed on Nov. 16, 2011, 5 pages.
U.S. Appl. No. 12/396,464, Final Office Action mailed on Jan. 16, 2013, 17 pages.
U.S. Appl. No. 12/396,464, Non-Final Office Action mailed on Sep. 7, 2012, 18 pages.
U.S. Appl. No. 12/506,891, Notice of Allowance mailed on Jul. 25, 2012, 8 pages.
U.S. Appl. No. 12/506,891, Non-Final Office Action mailed Dec. 2011, 41 pages.
U.S. Appl. No. 12/506,905, Advisory Action mailed Nov. 6, 2012, 6 pages.
U.S. Appl. No. 12/506,905, Notice of Allowance mailed on Dec. 14, 2012, 15 pages.
U.S. Appl. No. 12/506,905, Final Office Action mailed on Aug. 9, 2012, 42 pages.
U.S. Appl. No. 12/506,905, Non-Final Office Action mailed on Mar. 26, 2012, 86 pages.
U.S. Appl. No. 12/534,384, Notice of Allowance mailed on May 7, 2013, 12 pages.
U.S. Appl. No. 12/534,384, Non-Final Office Action mailed on Feb. 28, 2012, 38 pages.
U.S. Appl. No. 12/534,384, Final Office Action mailed on Feb. 12, 2013, 14 pages.
U.S. Appl. No. 12/534,398, Final Office Action mailed on Jun. 5, 2012, 27 pages.
U.S. Appl. No. 12/534,398, Notice of Allowance mailed on Nov. 27, 2012, 10 pages.
U.S. Appl. No. 12/534,398, Office Action mailed on Nov. 1, 2011, 32 pages.
U.S. Appl. No. 12/548,187, Final Office Action mailed on Jun. 10, 2013, 18 pages.
U.S. Appl. No. 12/548,187, Non Final Office Action mailed on Sep. 27, 2011, 19 pages.

(56) References Cited

OTHER PUBLICATIONS

U.S. Appl. No. 12/548,187, Non-Final Office Action mailed on Apr. 9, 2013, 17 pages.
U.S. Appl. No. 12/548,187, Final Office Action mailed on Jun. 20, 2012, 31 pages.
U.S. Appl. No. 12/548,209, Notice of Allowance mailed on Oct. 24, 2012, 22 pages.
U.S. Appl. No. 12/548,209, Non-Final Office Action mailed on Apr. 16, 2012, 40 pages.
U.S. Appl. No. 12/548,222, Non-Final Office Action mailed on Apr. 10, 2013, 16 pages.
U.S. Appl. No. 12/548,222, Non-Final Office Action mailed on Oct. 19, 2011, 19 pages.
U.S. Appl. No. 12/548,222, Notice of Allowance mailed on Jul. 18, 2013, 12 pages.
U.S. Appl. No. 12/548,222, Final Office Action mailed on Jun. 20, 2012, 29 pages.
U.S. Appl. No. 12/548,281, Non-Final Office Action mailed on Apr. 12, 2013, 16 pages.
U.S. Appl. No. 12/548,281, Non-Final Office Action mailed on Oct. 3, 2011, 20 pages.
U.S. Appl. No. 12/548,281, Final Office Action mailed on Jun. 20, 2012, 29 pages.
U.S. Appl. No. 12/548,290, Final Office Action mailed on Jul. 30, 2012, 34 pages.
U.S. Appl. No. 12/548,290, Non-Final Office Action mailed on Oct. 3, 2011, 17 pages.
U.S. Appl. No. 12/548,290, Non-Final Office Action mailed on Apr. 15, 2013, 17 pages.
U.S. Appl. No. 12/874,197, Notice of Allowance mailed on Jun. 22, 2012.
U.S. Appl. No. 12/913,636, Final Office Action mailed on Jan. 8, 2013, 21 pages.
U.S. Appl. No. 12/913,636, Non-Final Office Action mailed on Jun. 7, 2012.
U.S. Appl. No. 12/949,081, Final Office Action mailed on Aug. 27, 2013, 13 pages.
U.S. Appl. No. 12/949,081, Non-Final Office Action mailed on Jan. 9, 2013, 12 pages.
U.S. Appl. No. 12/957,194, Non-Final Office Action mailed on Dec. 7, 2012, 11 pages.
U.S. Appl. No. 12/957,194, Notice of Allowance mailed on Mar. 20, 2013, 9 pages.
U.S. Appl. No. 12/957,201, Final Office Action mailed on Apr. 25, 2013, 11 pages.
U.S. Appl. No. 12/957,201, Non-Final Office Action mailed on Dec. 19, 2012, 15 pages.
U.S. Appl. No. 13/089,556, Final Office Action mailed on Aug. 29, 2013, 10 pages.
U.S. Appl. No. 13/089,556, Non-Final Office Action mailed on Apr. 10, 2013, 10 pages.
U.S. Appl. No. 13/089,556, Non-Final Office Action mailed on Nov. 6, 2012, 13 pages.
U.S. Appl. No. 13/102,665, Final Office Action mailed on Jul. 9, 2013, 17 pages.
U.S. Appl. No. 13/102,665, Non-Final Office Action mailed on Feb. 1, 2013, 14 pages.
U.S. Appl. No. 13/107,742, Final Office Action mailed on Jul. 3, 2013, 19 pages.
U.S. Appl. No. 13/107,742, Non-Final Office Action mailed on Feb. 14, 2013, 16 pages.
U.S. Appl. No. 13/149,037, Non Final Office action mailed on May 1, 2013, 9 pages.
U.S. Appl. No. 13/177,748, Non-Final Office Action mailed on Aug. 30, 2013, 24 pages.
U.S. Appl. No. 13/184,528, Notice of Allowance mailed on Mar. 1, 2012.
U.S. Appl. No. 13/193,377, Final Office Action mailed on Jan. 17, 2013, 25 pages.
U.S. Appl. No. 13/193,377, Non-Final Office Action mailed on Aug. 23, 2012, 48 pages.
U.S. Appl. No. 13/244,272, Final Office Action mailed on Mar. 28, 2013, 29 pages.
U.S. Appl. No. 13/244,272, Non-Final Office Action mailed on Oct. 4, 2012, 30 pages.
U.S. Appl. No. 13/396,464, Non-Final Office Action mailed on Sep. 7, 2012.
U.S. Appl. No. 13/546,235, Non-Final Office Action mailed on Jul. 8, 2013, 13 pages.
Abadi et al., Yes Aurora: A Data Stream Management System, International Conference on Management of Data, Proceedings of the 2003 ACM SIGMOD International Conference on Management of Data, 2003, 4 pages.
Aho et al., Efficient String Matching: An Aid to Bibliographic Search, Communications of the ACM, vol. 18, No. 6, Association for Computing Machinery, Inc., Jun. 1975, pp. 333-340.
Arasu et al., An Abstract Semantics and Concrete Language for Continuous Queries over Streams and Relations, 9th International Workshop on Database programming languages, Sep. 2003, 11 pages.
Arasu et al., CQL: A language for Continuous Queries over Streams and Relations, Lecture Notes in Computer Science vol. 2921, 2004, pp. 1-19.
Arasu et al., STREAM: The Stanford Data Stream Management System, Department of Computer Science, Stanford University, 2004, p. 21.
Arasu et al., The CQL Continuous Query Language: Semantic Foundations and Query Execution, Stanford University, The VLDB Journal—The International Journal on Very Large Data Bases, vol. 15, No. 2, Springer-Verlag New York, Inc., Jun. 2006, pp. 1-32.
Avnur et al., Eddies: Continuously Adaptive Query Processing, In Proceedings of the 2000 ACM SIGMOD International Conference on Data, Dallas TX, May 2000, 12 pages.
Avnur et al., Eddies: Continuously Adaptive Query Processing, 2007, 4 pages.
Babcock et al., Models and Issues in Data Streams, Proceedings of the 21st ACM SIGMOD-SIGACT-SIDART symposium on Principles database systems, 2002, 30 pages.
Babu et al., Continuous Queries over Data Streams, SIGMOD Record, vol. 30, No. 3, Sep. 2001, pp. 109-120.
Bai et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Bose et al., A Query Algebra for Fragmented XML Stream Data, 9th International Conference on Data Base Programming Languages (DBPL), Sep. 2003, 11 pages.
Buza, Extension of CQL over Dynamic Databases, Journal of Universal Computer Science, vol. 12, No. 9, Sep. 28, 2006, pp. 1165-1176.
Carpenter, User Defined Functions, Retrieved from: URL: http://www.sqlteam.comitemprint.asp?ItemID=979, Oct. 12, 2000, 4 pages.
Chan et al., Efficient Filtering of XML documents with Xpath expressions, 2002, pp. 354-379.
Chan Drasekaran et al., TelegraphCQ: Continuous Dataflow Processing for an UncertainWorld, Proceedings of CIDR, 2003, 12 pages.
Chen et al., NiagaraCQ: A Scalable Continuous Query System for Internet Databases, Proceedings of the 2000 SIGMOD International Conference on Management of Data, May 2000, pp. 379-390.
Colyer et al., Spring Dynamic Modules Reference Guide, Copyright, ver. 1.0.3, 2006-2008, 73 pages.
Colyer et al., Spring Dynamic Modules Reference Guide, Ver. 1.1.3, 2006-2008, 96 pages.
Conway, An Introduction to Data Stream Query Processing, Truviso, Inc., May 24, 2007, 71 pages.
Demers et al., Towards Expressive Publish/Subscribe Systems, Proceedings of the 10th International Conference on Extending Database Technology (EDBT 2006), Munich, Germany, Mar. 2006, pp. 1-18.

(56) References Cited

OTHER PUBLICATIONS

Demichiel et al., JSR 220: Enterprise JavaBeans™, EJB 3.0 Simplified API, EJB 3.0 Expert Group, Sun Microsystems, Ver. 3.0, May 2, 2006, 59 pages.
Deshpande et al., Adaptive Query Processing, Slide show believed to be prior to Oct. 17, 2007, Oct. 17, 2007, 27 pages.
Diao et al., Query Processing for High-Volume XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar et al., Event Processing Support for Cross-Reality Environments, Pervasive Computing, IEEE CS, Jul.-Sep. 2009, Copyright 2009, IEEE, Jul.-Sep. 2009, pp. 2-9.
Fernandez et al., Build your own XQuery processor, slide show, at URL: http://www.galaxquery.org/slides/edbt-summer-school2004.pdf, 2004, 116 pages.
Fernandez et al., Implementing XQuery 1.0: The Galax Experience, Proceedings of the 29th VLDB Conference, Berlin, Germany, 2003, 4 pages.
Florescu et al., The BEA/XQRL Streaming XQuery Processor, Proceedings of the 29th VLDB Conference, 2003, 12 pages.
Gilani, Design and implementation of stream operators, query instantiator and stream buffer manager, Dec. 2003, 137 pages.
Golab et al., Issues in Data Stream Management, ACM SIGMOD Record, vol. 32, issue 2, ACM Press, Jun. 2003, pp. 5-14.
Golab et al., Sliding Window Query Processing Over Data Streams, Aug. 2006, 182 pages.
Gosling et al., The Java Language Specification, 1996-2005, 684 pages.
Hao et al., Achieving high performance web applications by service and database replications at edge servers, Performance Computing and communications conference(IPCCC) IEEE 28th International, IEEE, Piscataway, NJ, USA, 2009, pp. 153-160.
Hopcroft, Introduction to Automata Theory, Languages, and Computation, Second Edition, Addison-Wesley, Copyright 2001, 524 pages.
Hulten et al., Mining Time-Changing Data Stream, Proceedings of the Seventh ACM SIGKDD International Conference on Knowledge Discovery and Data Mining, Aug. 2001, 10 pages.
Jin et al., ARGUS: Efficient Scalable Continuous Query Optimization for Large-Volume Data Streams, 10th International Database Engineering and Applications Symposium (IDEAS'06), 2006, 7 pages.
Kawaguchi et al. "Java Architecture for XML Binding (JAXB) 2.2", Sun Microsystems, Inc., Dec. 10, 2009, 384 pages.
Knuth et al., Fast Pattern Matching in Strings, Siam J Comput., vol. 6, No. 2, Jun. 1977, pp. 323-350.
Lakshmanan et al., On efficient matching of streaming XML documents and queries, 2002, 18 pages.
Lindholm et al., Java Virtual Machine Specification, 2nd Edition Prentice Hall, Apr. 1999, 484 pages.
Liu et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP?, Complex Event Processing, downloaded at URL: http://complexevents.com/?p=103, Apr. 29, 2011, 5 pages.
Madden et al., Continuously Adaptive Continuous Queries (CACQ) over Streams, SIGMOD 2002, Jun. 4-6, 2002, 12 pages.
Martin et al., Finding Application Errors and Security Flaws Using PQL, a Program Query Language, OOPSLA'05, Oct. 16, 2005, pp. 1-19.
Motwani et al., Query Processing Resource Management, and Approximation in a Data Stream Management System, Jan. 2003, 12 pages.
Munagala et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, Jan. 1, 2003, pp. 225-233.
Novick, Creating a User Defined Aggregate with SQL Server 2005, URL: http://novicksoftware.com/Articles/sql-2005-product-user-defined-aggregate.html, 2005, 6 pages.
International Application No. PCT/US2011/052019, International Search Report and Written Opinion mailed on Nov. 17, 2011, 55 pages.
International Application No. PCT/US2012/034970, International Search Report and Written Opinion mailed on Jul. 16, 2012, 13 pages.
International Application No. PCT/US2012/036353, International Search Report and Written Opinion mailed on Sep. 12, 2012, 11 pages.
Peng et al., Xpath Queries on Streaming Data, 2003, pp. 1-12.
Peterson, Petri Net Theory and the Modeling of Systems, Prentice Hall, 1981, 301 pages.
PostgresSQL, Manuals: PostgresSQL 8.2: Create Aggregate, believed to be prior to Apr. 21, 2007, 4 pages.
PostgresSQL, Documentation: Manuals: PostgresSQL 8.2: User-Defined Aggregates believed D to be prior to Apr. 21, 2007, 4 pages.
Sadri et al., Expressing and Optimizing Sequence Queries in Database Systems, ACM Transactions on Database Systems, vol. 29, No. 2, ACM Press, Copyright 2004, Jun. 2004, pp. 282-318.
Sadtler et al., WebSphere Application Server Installation Problem Determination, Copyright 2007, IBM Corp., 2007, pp. 1-48.
Sansoterra, Empower SQL with Java User-Defined Functions, ITJungle.com, Oct. 9, 2003, 9 pages.
Sharaf et al., Efficient Scheduling of Heterogeneous Continuous Queries, VLDB '06, Sep. 12-15, 2006, pp. 511-522.
Stolze et al., User-defined Aggregate Functions in DB2 Universal Database, Retrieved from: http://www.128.ibm.com/devel0perworks/d b2/library/tachartic1e/0309stolze/0309stolze.html, Sep. 11, 2003, 11 pages.
Stump et al., Proceedings, The 2006 Federated Logic Conference, IJCAR '06 Workshop, PLPV '06: Programming Languages meets Program Verification, 2006, pp. 1-113.
Terry et al., Continuous queries over append-only database, Proceedings of ACM SIGMOD, 1992, pp. 321-330.
Ullman et al., Introduction to JDBC, Stanford University, 2005, 7 pages.
Vajjhala et al., The Java, Architecture for XML Binding (JAXB) 2.0, Apr. 19, 2006, 384 pages.
Vijayalakshmi et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from URL: http://www.w3.org/TR/xpath, Nov. 16, 1999, 37 pages.
Wang et al., Distributed continuous range query processing on moving objects, DEXA'06 Proceedings of the 17th international conference on Database and Expert Systems Applications, 2006, pp. 655-665.
White et al., WebLogic Event Server: A Lightweight, Modular Application Server for Event Processing, 2nd International Conference on Distributed Event-Based Systems, Rome, Italy, Copyright 2004, Jul. 2-4, 2008, 8 pages.
Widom et al., CQL: A Language for Continuous Queries over Streams and Relations mailed on Oct. 17, 2007, 62 pages.
Widom et al., The Stanford Data Stream Management System, PowerPoint Presentation, Oct. 17, 2007, 110 pages.
Wu et al., Dynamic Data Management for Location Based Services in Mobile Environments, Database Engineering and Applications Symposium, Jul. 16, 2003, pp. 172-181.
Zemke, XML Query, Mar. 14, 2004, 29 pages.
U.S. Appl. No. 12/548,281, Non-Final Office Action mailed on Feb. 13, 2014, 16 pages.

(56) References Cited

OTHER PUBLICATIONS

U.S. Appl. No. 13/177,748, Final Office Action mailed on Mar. 20, 2014, 23 pages.
PCT Patent Application No. PCT/US2014/010832, International Search Report mailed on Apr. 3, 2014, 9 pages.
Cadonna et al., Efficient event pattern matching with match windows, Proceedings of the 18th ACM SIGKDD international conference on knowledge discovery and data mining (Aug. 2012), pp. 471-479.
Nichols et al., A faster closure algorithm for pattern matching in partial-order event data, IEEE International Conference on Parallel and Distributed Systems (Dec. 2007), pp. 1-9.
U.S. Appl. No. 12/949,081, Non-Final Office Action mailed on Jan. 28, 2015, 20 pages.
U.S. Appl. No. 12/957,201, Notice of Allowance mailed on Jan. 21, 2015, 5 pages.
U.S. Appl. No. 13/107,742, Final Office Action mailed on Jan. 21, 2015, 23 pages.
U.S. Appl. No. 13/177,748, Non-Final Office Action mailed on Feb. 3, 2015, 22 pages.
U.S. Appl. No. 13/770,961, Non-Final Office Action mailed on Feb. 4, 2015, 22 pages.
U.S. Appl. No. 13/770,969, Notice of Allowance mailed on Jan. 22, 2015, 5 pages.
U.S. Appl. No. 13/829,958, Non-Final Office Action mailed on Dec. 11, 2014, 15 pages.
International Application No. PCT/US2014/010832, Written Opinion mailed on Dec. 15, 2014, 5 pages.
International Application No. PCT/US2014/010920, International Search Report and Written Opinion mailed on Dec. 15, 2014, 10 pages.
International Application No. PCT/US2014/017061, Written Opinion mailed on Feb. 3, 2015, 6 pages.
International Application No. PCT/US2014/039771, International Search Report and Written Opinion mailed on Sep. 24, 2014, 12 pages.
Cranor et al. "Gigascope: a stream database for network applications," Proceedings of the 2003 ACM SIGMOD international conference on Management of data, pp. 647-651 (Jun. 2003).
Non-Final Office Action for U.S. Appl. No. 13/830,378 dated Feb. 25, 2015, 23 pages.
Non-Final Office Action for U.S. Appl. No. 13/830,129 dated Feb. 27, 2015, 19 pages.
International Application No. PCT/US2014/068641, International Search Report and Written Opinion mailed on Feb. 26, 2015, 11 pages.
European Patent Application No. 12783063.6, Extended Search Report mailed Mar. 24, 2015, 6 pages.
Non-Final Office Action for U.S. Appl. No. 12/913,636 dated Apr. 1, 2015, 22 pages.
Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Actio for U.S. Appl. No. 14/037,072 dated Jul. 9, 2015, 12 pages.
Non-Final Office Action for U.S. Appl. No. 13/830,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
Final Office Action for U.S. Appl. No. 14/302,031 dated Apr. 22, 2015, 23 pages.
Non-Final Office Action for U.S. Appl. No. 14/692,674 dated Jun. 5, 2015, 22 pages.
Non-Final Office Action for U.S. Appl. No. 14/037,171 dated Jun. 3, 2015, 15 pages.
Non-Final Office Action for U.S. Appl. No. 14/830,735 dated May 26, 2015, 19 pages.
Final Office Action for U.S. Appl. No. 13/830,428 dated Jun. 4, 2015, 21 pages.
Non-Final Office Action for U.S. Appl. No. 14/838,259 dated Jun. 9, 2015, 37 pages.
Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
International Application No. PCT/US2014/039771, International Search Report and Written Opinion mailed on Apr. 29, 2015 6 pages.
International Application No. PCT/US2015/016346, International Search Report and Written Opinion mailed on May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
Non-Final Office Action for U.S. Appl. No. 14/079,538 dated Oct. 22, 2015, 34 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
China Patent Office office actions for patent application CN201180053021.4 (Oct. 28, 2015).
Notice of Allowance for U.S. Appl. No. 12/913,636 dated Oct. 27, 2015, 22 pages.
Final Office Action for U.S. Appl. No. 13/830,378 dated Nov. 5, 2015, 28 pages.
Final Office Action for U.S. Appl. No. 13/828,640 dated Jun. 17, 2015, 11 pages.
Non-Final Office Action for U.S. Appl. No. 14/036,500 dated Aug. 14, 2015, 26 pages.
Notice of Allowance for U.S. Appl. No. 14/077,230 dated Apr. 16, 2015, 16 pages.
Non-Final Office Action for U.S. Appl. No. 13/830,502 dated Dec. 11, 2015, 25 pages.
Non-Final Office Action for U.S. Appl. No. 11/601,415 dated Nov. 13, 2015, 18 pages.
China Patent Office office actions for patent application CN201280022008.7 (Dec. 3, 2015).
European Application No. 12783063.6, Office Action mailed on Nov. 11, 2015, 8 pages.
U.S. Appl. No. 13/830,129, Notice of Allowance mailed on Sep. 22, 2015, 9 pages.
Notice of Allowance for U.S. Appl. No. 12/548,187, dated Feb. 2, 2016, 15 pages.
Notice of Allowance for U.S. Appl. No. 14/037,072 dated Feb. 16, 2016, 17 pages.
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Notice of Allowance for U.S. Appl. No. 13/828,640 dated Jan. 6, 2016, 16 pages.
Non-Final Office Action for U.S. Appl. No. 13/830,428 dated Jan. 15, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.

(56) References Cited

OTHER PUBLICATIONS

Non-Final Office Action for U.S. Appl. No. 13/827,631 dated Feb. 11, 2016, 12 pages.
Ghazal et al., Dynamic plan generation for parameterized queries, Jul. 2009, 7 pages.
Chaudhuri et al., Variance aware optimization of parameterized queries, Jun. 2010, 12 pages.
Seshadri et al., SmartCQL: Semantics to Handle Complex Queries over Data Streams, 2010, 5 pages.
International Search Report and Written Opinion dated Dec. 15, 2015 for PCT/US2015/051268, 17 Pages.
"11 Oracle Event Processing NoSQL 1-20 Database Data Cartridge—Ilg Release 1 (11.1.1.7) 11," Oracle Fusion Middleware CQL Language Reference for Oracle Event Processing 11g Release 1 (11.1.1.7), 4 pages (Sep. 25, 2013).
Oracle Event Processing Hadoop Data Cartridge—11g Release 1(11.1.1.7), Oracle Fusion Middleware CQL LanguageReference for Oracle Event Processing 11g Release 1 (11.1.1.7) 4 pages (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).
Katsov "In-Stream Big Data Processing : Highly Scalable Blog" 19 pages (Aug. 29, 2014).
Data stream management system, Wikipedia, downloaded from en.wikipedia.org/wiki/Data_stream_management_system, pp. 1-5.
Oracle Complex Event Processing Exalogic Performance Study, http://www.oracle.com/technetwork!middleware/complex-event-processing/overview/cepexalogicwhitepaperfinal-498043.pdf, Sep. 2011, pp. 1-16.
Oracle® Complex Event Processing EPL Language Reference 11g Release 1 (11.1.1.4.0), E14304-02, Jan. 2011, 80 pages.
De Castro Alves, A General Extension System for Event Processing Languages, DEBS '11, New York, NY, USA, Jul. 11-15, 2011, pp. 1-9.
Josifovsky et al., Querying XML Streams, The VLDB Journal, vol. 14, 2005, pp. 197-210.
Purvee, Optimizing SPARQLeR Using Short Circuit Evaluation of Filter Clauses, Master of Science Thesis, Univ. of Georgia, Athens, GA, 2009, 66 pages.
Takenaka et al., A scalable complex event processing framework for combination of SQL-based continuous queries and C/C++ functions, FPL 2012, Oslo, Norway, Aug. 29-31, 2012, pp. 237-242.
Tomàs et al., RoSeS: A Continuous Content-Based Query Engine for RSS Feeds, DEXA 2011, Toulouse, France, Sep. 2, 2011, pp. 203-218.
Weidong et al., LeoXSS: An Efficient XML Stream System for Processing Complex XPaths, CIT 2006, Seoul, Korea, 2006, 6 pages.
Japanese Application No. 2013-529376, Office Action mailed on Aug. 18, 2015, 2 pages.
U.S. Appl. No. 13/177,748, Final Office Action mailed on Aug. 21, 2015, 24 pages.
U.S. Appl. No. 13/764,560, Final Office Action mailed on Apr. 15, 2015, 19 pages.
U.S. Appl. No. 13/764,560, Non-Final Office Action mailed on Oct. 6, 2015, 18 pages.
U.S. Appl. No. 13/770,961, Final Office Action mailed on Aug. 31, 2015, 28 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
Final Office Action for U.S. Appl. No. 13/830,759 dated Feb. 18, 2016, 18 pages.
Notice of Allowance for U.S. Appl. No. 13/770,961 dated Apr. 4, 2016, 8 pages.
Final Office Action for U.S. Appl. No. 13/838,259 dated Feb. 19, 2016, 47 pages.
Final Office Action for U.S. Appl. No. 14/036,500 dated Mar. 17, 2016, 34 pages.
Final Office Action for U.S. Appl. No. 13/764,560 dated Apr. 14, 2016, 20 pages.
Final Office Action for U.S. Appl. No. 14/621,098 dated Apr. 21, 2016, 16 pages.
Hirzel et al., "SPL Stream Processing Language Report", IBM Research Report RC24897 (W0911-044), IBM Research Division, Thomas J. Watson Research center, Yorktown Heights, NY, Nov. 5, 2009, 19 pages.
Japan Patent Office office actions JPO patent application JP2014-509315 (Mar. 15, 2016).
Yosuke Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Shuhei Kuwata et al., Stream Data Analysis Application for Customer Behavior with Complex Event Processing, IEICE Technical Report, The Institute of Electronics, Information and Communication Engineers, Jun. 21, 2010, vol. 110, No. 107, pp. 13-18.
Hiroyuki Kitagawa et al., Sensing Network, Information Processing, Information Processing Society of Japan, Sep. 15, 2010, vol. 51, No. 9, pp. 1119-1126.
Final Office Action for U.S. Appl. No. 14/036,659 dated Apr. 22, 2016, 38 pages.
Non-Final Office Action for U.S. Appl. No. 14/883,815 dated May 10, 2016, 32 pages.
Notice of Allowance for U.S. Appl. No. 12/949,081 dated May 3, 2016, 6 pages.

(56) References Cited

OTHER PUBLICATIONS

Bestehorn Fault-tolerant query processing in structured P2P-systems, Springer Science+Business Media LLC Distrib Parallel Databases 28:33-66 (May 8, 2010).

Kramer "Semantics and Implementation of Continuous Sliding Window Queries over Data Streams" ACM Transactions on Database Systems, vol. 34, pp. 4:1 to 4:49 (Apr. 2009).

Final Office Action for U.S. Appl. No. 13/830,428 dated May 26, 2016, 26 pages.

Final Office Action for U.S. Appl. No. 11/601,415 dated May 17, 2016, 17 pages.

International Application No. PCT/RU2015/000468, International Search Report and Written Opinion mailed on Apr. 25, 2016, 9 pages.

International Application No. PCT/US2015/016346, International Search Report and Written Opinion mailed on May 24, 2016, 5 pages.

cooperativesystems: "Combined WLAN and Inertial Indoor Pedestrian Positioning System" URL:https://www.youtube.com/watch?v=mEt88WaHZvU.

Frank et al "Development and Evaluation of a Combined WLAN & Inertial Indoor Pedestrian Positioning System" Proceedings of the $22^{nd}$ International Technical Meeting of the Satellite Division of the Institute Of Navigation (ION GNSS 2009). (Sep. 25, 2009) pp. 538-546.

China Patent Office office action for patent application CN201180053021.4 (May 27, 2016).

\* cited by examiner

VALUE BASED WINDOWS ON RELATIONS IN CONTINUOUS DATA STREAMS

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

In some examples, a method is provided for managing value-based windows on relations. The method may include receiving a continuous query that identifies an input relation. In one example, the input relation is a bounded set of data records related to an application. The method may then include identifying a configurable window operator associated with processing the input relation. Additionally, the method may include executing the continuous query based at least in part on the configurable window operator to generate an output relation. In some aspects, the method may also include providing data records of the output relation based at least in part on execution of the continuous query.

In some examples, the input relation may be an external data source generated based at least in part on an incoming continuous input data stream related to the application. Additionally, in some examples, the input relation may be an external data source generated based at least in part on information related to the application stored in a database of historical data. The input relation may also be an external data source generated based at least in part on one or more archived relations related to the application.

In some examples, the configurable window operator may be a generic value window operator defined over the input relation and the method may include applying the generic value window operator on an attribute in the input relation to generate the output relation. In other examples, the configurable window operator may be a current hour value window operator defined over the input relation and the method may include applying the current hour value window operator on an attribute in the input relation to generate the output relation. Additionally, in some examples, the configurable window operator may be a current period value window operator defined over the input relation and the method may include applying the current period value window operator on an attribute in the input relation to generate the output relation.

In some aspects, the method may also include displaying the output relation. In some examples, the output relation may include a subset of the data records from the input relation whose attribute values lie within a specified range defined by the configurable window operator.

In some examples, a non-transitory computer-readable medium may be provided. The medium may store a plurality of instructions executable by one or more processors. The instructions, in some examples, may include to generating an input relation and identifying a query configured to process the input relation. Additionally, the instructions may include identifying a configurable window operator associated with processing the input relation and executing the query based at least in part on the configurable window operator to generate an output relation. In some aspects, the instructions may also include providing data records of the output relation based at least in part on execution of the continuous query by displaying the output relation. In some examples, the output relation may include a subset of the data records from the input relation whose attribute values lie within a specified range defined by the configurable window operator.

In some examples, a system may be provided. The system may include a memory and one or more processors configured to access the memory and execute instructions to generate an input relation. The instructions may also be executed to identify a query configured to process the input relation and identify a configurable window operator associated with processing the input relation. Additionally, the instructions may be executed to execute the query based at least in part on the configurable window operator to generate an output relation.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
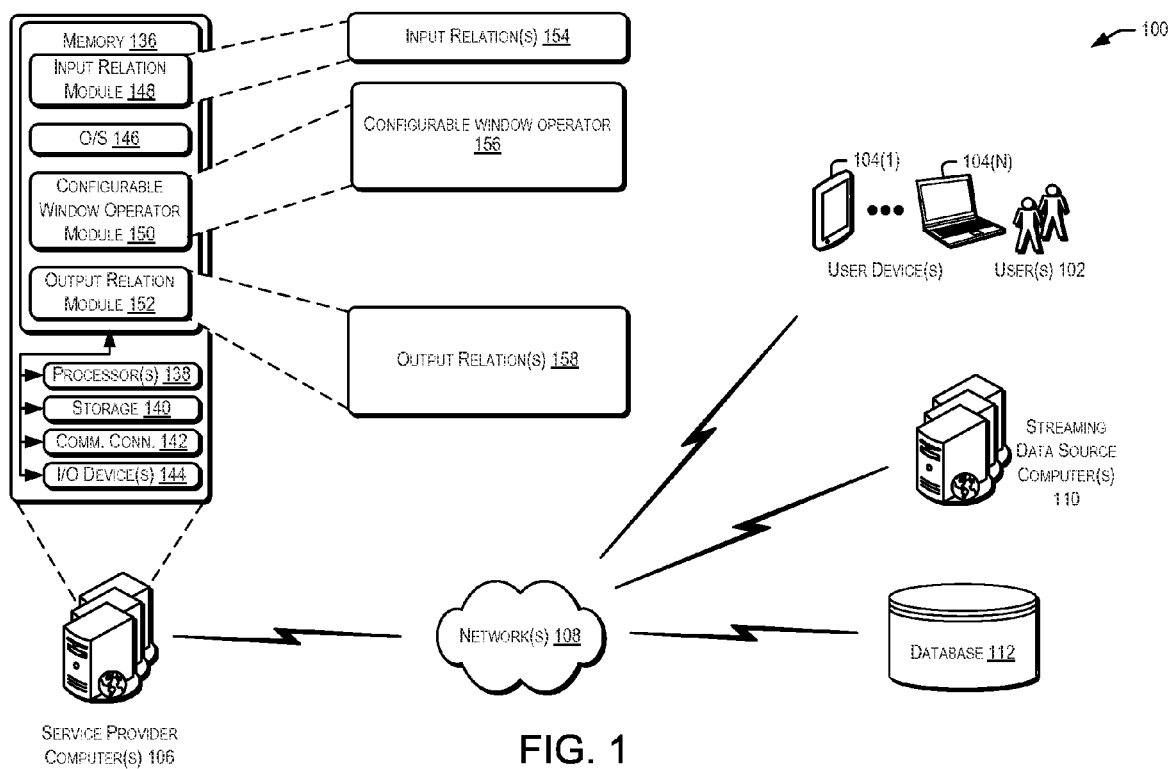
FIG. 1 depicts a simplified example system or architecture in which techniques for managing value-based windows on relations may be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some applications, data may take the form of continuous, unbounded data streams, rather than finite stored data sets. Examples of such data streams may include stock ticks in financial applications, performance measurements in network monitoring and traffic management, log records or click-streams in web tracking and personalization, data feeds from sensor applications, network packets and messages in firewall-based security, call detail records in telecommunications, and the like. Due to their continuous nature, these data streams may typically be queried using continuous queries rather than traditional one-time SQL queries.

In general, a continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp_N+1>, <ORCL,62>), the event is <ORCL,62> with attributes "stock_symbol" and "stock_value." The timestamp associated with the stream element is "timestamp N+1". A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some examples, business intelligence (BI) may help drive and optimize business operations at particular intervals (e.g., on a daily basis in some cases). This type of BI is usually called operational business intelligence, real-time business intelligence, or operational intelligence (OI). Operational Intelligence, in some examples, blurs the line between BI and business activity monitoring (BAM). For example, BI may be focused on periodic queries of historic data. As such, it may have a backward-looking focus. However, BI may also be placed into operational applications, and it may therefore expand from a mere strategic analytical tool into the front lines in business operations. As such, BI systems may also be configured to analyze event streams and compute aggregates in real time.

In some examples, a continuous query language service (CQ Service) may be configured to extend a BI analytics server to handle continuous queries and enable real-time alerts. The CQ Service, in some aspects, may provide integration with a BI analytics server and a CQL engine. By way of example only, a BI analytics server may delegate continuous queries to the CQ Service and the CQ Service may also act as a logical database (DB) gateway for a CQL engine. In this way, the CQL engine may be able to leverage the BI analytics server for its analytics capabilities and semantic modeling.

In some examples, the CQ Service may provide, among other things, the following functionalities:
  Remoting service for BI Analytics Server as CQL engine Gateway;
  Event source/sink adapter;
  Generate data definition languages (DDLs) from logical SQL plus CQL extensions;
  Provide unified model for all types of continuous queries and implementation selections;
  Maintain metadata and support restartability; and
  High availability and scalability support.

Additionally, in some examples, OI is a form of real-time dynamic, business analytics that can deliver visibility and insight into business operations. OI is often linked to or compared with BI or real-time BI, in the sense that both help make sense out of large amounts of information. But there are some basic differences: OI may be primarily activity-centric, whereas BI may be primarily data-centric. Additionally, OI may be more appropriate for detecting and responding to a developing situation (e.g., trend and pattern), unlike BI which may traditionally be used as an after-the-fact and report-based approach to identifying patterns.

In some examples, a business event analysis and monitoring (BEAM) system may include a CQL engine to process and/or receive in-flight data. For example, a CQL engine may be an in-memory real-time event processing engine configured to query or otherwise process incoming real-time information (e.g., BI or OI). The CQL engine may utilize or understand temporal semantics and be configured to allow definition of a window of data to process. Utilizing a CQL engine may, in some cases, involve always running a query on incoming data.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement the combination of historical data with real-time data.

In some examples, the above concepts may be utilized to leverage the rich real-time and continuous event processing capabilities associated with complex event processing. Several features may be supported such as, but not limited to, archived relations. As such, in order to leverage such features (e.g., rich, real-time and continuous event processing), the system may be configured to transparently deal with startup state and runtime state of relational data. In other words, the system may be configured to manage a query that is non-empty at the instant of its creation (i.e., an archived relation).

In some examples, an archived relation may be utilized. As such, when a CQL engine sees a query that indicates that it is based on an archived relation; that archived relation may also indicate that there are certain entities it can call to query for historical context, for example. In some examples, a data definition language (DDL) may indicate annotations about the archived relation such as, but not limited to, how do to the query, what are the important columns in the table, and/or where to send the rest of the data. In some examples, once the query is constructed in the CQL engine (e.g., as a graph), the system may analyze the query graph. Additionally, in some aspects, there are certain operators that are stateful, like "distinct," "group aggr," "pattern," and/or "group by." However, stateless operators may just take input and send it to the parent, for example, down-stream operators. So, one approach is to store this entire table here. However, utilizing archived relations, the system may analyze the query graph and decide which of the lowest stateful operator that it can use to query the archive. In some examples, the system (or one or more computer-implemented methods) may retrieve the state at the lowest stateful operator reached while traversing the graph. For example, the query graph may be analyzed in a topological order from the source. Based at least in part on this first stateful operator, the CQL engine may then determine the optimal amount of data to be fetched in order to initialize the state of the operators for a query defined over an archived relation.

In at least one non-limiting example, source operators like relation and/or source may come first in the topological traversal with query output and/or root coming last. For example, if the CQL query looks like: select sum (c1) from R1 where c2>c25, the plan for this query may look like: RelationSource→SELECT→GroupAggr. Thus, following the topological order, and since RelationSource and SELECT are both stateless, the lowest stateful operator may be GroupAggr. In this way, the stateful operators of a query (GroupAggr in this example) may enable the query engine to populate the query engine with historical data from a data store prior to receiving streaming data. This may be enabled based at least in part on the fact that the query is analyzing an archived relation and the archived relation has been indicated as such.

In some examples, a window size for a given archive relation may be specified by a user. A window, in some aspects, in relation to an archived relation, may include a node in a query graph that analyzes or otherwise evaluates incoming active data. In other words, the window may define the amount of active data that may be analyzed and/or processed by the query engine and/or the amount of historical data that will be included in the archived relation.

At a high level, once a window is applied on a Stream it becomes a Relation and then regular relational logic may be applied, as with relational databases. As tuples arrive and leave the window, the Relation under consideration changes with queries compiled against it emitting results at the same time. CQL may support RANGE (up to nanoseconds granularity), ROWS, PARTITION BY and extensible windows. These windows are examples of stream-to-relation operators. On the other hand, ISTREAM (i.e., insert stream), DSTREAM (i.e., delete stream) and RSTREAM (i.e., relation stream) are relation-to-stream operators. In some examples, a user, developer, and/or manager may set the window size (e.g., via a UI) provided by the query engine or one or more computing systems operating or hosting the query engine. In some examples, a window on a stream may be a time-based range window. For example, a configurable value window on an archived relation may be specified using window size and the attribute on which the window is calculated. When there is a configurable value window specified on top of archived relation, a snapshot query may be computed and the snapshot tuples which are within window limits may be output. Additionally, after state initialization, the value window may be applied on incoming active data. In some examples, only the incoming active data will be inserted into window whose window attribute's value is differing from current event time for less than the window size.

As discussed above, in some examples, the processing of continuous data streams using continuous queries may involve applying a window on the stream, specifying that a fixed number of the most recent stream tuples are considered instead of the entire stream history, or specifying that only stream tuples that have arrived within a specified time are considered, instead of the entire stream history. As further discussed above, in some examples, continuous query processing may involve the use of various operators that process incoming continuous streams to convert it to a relation or operators that convert an input relation to output stream data.

In certain situations, however, a user may set a query that may require the processing of incoming real-time data related to an application with data related to the application that is stored in a relation (e.g., an external data source). If the size of the relation is very large, the amount of data that is needed to be brought into memory to query this data may also be very large. Since the CQL engine may typically be an in-memory real-time event processing engine configured to query or otherwise process incoming real-time information, it may not be scalable to join such a high rate input stream with a big sized relation in limited memory.

Accordingly, in some embodiments, a window operator may be defined for processing a relation in a continuous query (e.g., a CQL query). In one example, the window operator may be user-configurable. The window operator may enable processing a subset of data records in the relation over a specified range of time. Accordingly, a subset of the data records of the relation may be queried in limited memory rather than processing the entire set of data records of the relation in memory.

In certain embodiments, an input relation may be generated. In one example, the input relation may be an external data source that includes a bounded set of data records related to an application. In one example, the input relation may be generated from a continuous input data stream. Alternatively, the input relation may be generated based on a database of historical data related to the application. Additionally, the input relation may initially be generated from one or more archived relations and the remainder of the input relation may be generated based on the incoming streaming data.

In accordance with one embodiment of the present disclosure, a continuous query (e.g., a CQL query) that identifies the input relation may be received. A window operator defined over the input relation may then be identified. The query may be executed based at least in part on the window operator to generate an output relation. In one embodiment, the output relation may include a subset of data records from the input relation whose attribute values may lie within a specified range defined by the window operator in the input relation.

The techniques described above and below may be implemented in a number of ways and in a number of contexts. Several example implementations and contexts are provided with reference to the following figures, as described below in more detail. However, the following implementations and contexts are but a few of many.

FIG. 1 depicts a simplified example system or architecture 100 in which techniques for managing value-based windows on relations may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the management of CQL relations, generation of input relations, configurable window operators associated with the input relations, and the generation of output relations, described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the service provider computers 106 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least an input relation module 148, a configurable window operator module 150 and an output relation module 152. As used herein, modules may refer to programming modules executed by servers or clusters of servers that are part of a service. In this particular context, the modules may be executed by the servers or clusters of servers that are part of the service provider computers 106.

In some examples, the input relation module 148 may be configured to, receive, identify, generate, or otherwise provide one or more input relations. In one embodiment, the input relation 154 is an external data source that includes a bounded set of data records related to an application (e.g., a relation or an archived relation).

In one example, the input relation 154 may be an external data source that may be generated based on an incoming continuous input data stream that includes a stream of data or events related to the application (e.g., from the data source computers 110), wherein the input relation may include a bounded set of data records that comprise one or more of the event stream entries s1, s2, . . . , sN in the continuous data stream. In another example, the input relation 154 may be an external data source that may be generated based on information related to the application stored in a database of historical data (for e.g., the databases 112), wherein the input relation may include a bounded set of data records that include or more event stream entries (e.g., s1 and/or s2, more entries, or less) that are pre-loaded from Persistence, or a database of historical data.

In other examples, the input relation 154 may be an external data source that may be generated based on one or more archived relations that may include reference to one or more event stream entries s1, s2, . . . , sN related to the application. In one example, the input relation 154 may be initially generated from one or more archived relations and the remainder of the input relation may be generated based on the incoming streaming data.

In one example, the data records in the input relation 154 may include a sequence of time stamped tuples or data records that capture the changing state of the input relation 154. In one embodiment, each data record in the input relation 154 may include an event stream entry that may be represented by the following schema 'S': (<time_stamp>, <attribute(s)>), where <attributes> represents the data portion of the schema and can comprise one or more attributes.

The configurable window operator module 150 may be configured to define one or more configurable window operators 156 for processing the input relation in a continuous query. There are various ways in which a configurable window operator may be defined for an input relation. In one embodiment, the configurable window operator may be user-configurable. In certain embodiments, and as will be discussed in detail below, the configurable window operator may produce an output relation which includes a subset of data records from the input relation whose attribute values lie in a range specified by the configurable window operator with respect to the timestamp t of a data record in the input relation.

In one embodiment, a first type of configurable window operator may be defined as a "generic value" window operator over the input relation. In one example, the "generic value" window operator may be expressed as a sub-clause on the input relation 154 as follows:

RANGE range_val ON attr.

In certain embodiments, the "generic value" window operator may produce an output relation which includes a subset of data records from the input relation whose attribute "attr" values lie in the specified range, "range_val" with respect to the timestamp t of a corresponding data record in the input relation. An example operation of the manner in which the "generic value" window operator may be defined over an input relation in a CQL query is discussed in detail below.

In another embodiment, a second type of configurable window operator may be defined as a "current hour value" window operator on the input relation. In one example, the "current hour value" window operator may be expressed as a sub-clause on an input relation as follows:

CurrentHour on attr

In one embodiment, the "current hour value" window operator may produce an output relation which includes a subset of data records from the input relation whose attribute "attr" values lies in the current hour, "CurrentHour" with respect to the timestamp t of a corresponding data record in the input relation. An example operation of the manner in which the "current hour value" window operator may be defined over an input relation in a CQL query is discussed in detail below.

In another embodiment, a third type of configurable window operator may be defined as a "current period value" window operator on the input relation. In one example, the "current period value" window operator may be expressed as a sub-clause on an input relation as follows:

CurrentPeriod ("t1", "t2") on attr

In one embodiment, the "current period value" window operator may produce an output relation which includes a subset of data records from the input relation whose attribute "attr" values lies in the current time period, "CurrentPeriod" with respect to the timestamp t of a corresponding data record in the input relation. An example operation of the manner in which the "CurrentPeriod" window operator may be defined over an input relation in a CQL query is discussed in detail below.

Although the above discussion relates to defining three types of configurable window operators over input relations in a CQL query, it is to be appreciated that additional types of window operators may be defined by the configurable window operator module 150 on input relations in a CQL query, in at least some embodiments.

The output relation module 152 may be configured to generate one or more output relation(s) 158. In one embodiment, the output relation module 152 may be configured to receive a CQL query from a CQL Engine and/or CQ Service. In certain embodiments, the output relation module 152 may identify an input relation in the CQL query, identify a configurable window operator defined over the input relation and execute the CQL query based at least in part on the configurable window operator to generate an output relation. Alternatively, in some examples, when a query (e.g., a CQL query) is identified or received that includes an input relation, the CQL engine and/or CQ Service may parse the query 206 to process the input relation and generate the output relation. In one embodiment, and as will be discussed in detail below, the output relation includes a subset of data records from the input relation whose attribute values lie within a specified range defined by the configurable window operator in the input relation. In certain embodiments, a CQL query may then be received to process the subset of the data records in the output relation in memory.

Figure 2:
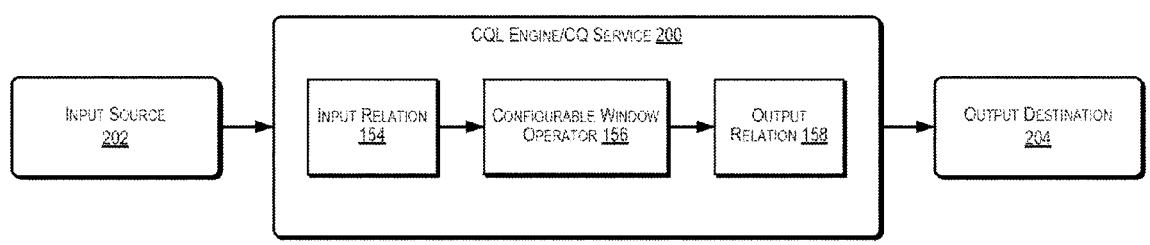
FIG. 2 illustrates a simplified block diagram with which features for the management of value-based windows on relations may be described.

FIG. 2 illustrates a simplified block diagram with which features for the management of value-based windows on relations may be described. As shown, FIG. 2 describes at least one implementation of a CQL Engine and/or CQ Service 200 for managing an input relation 154. The CQL Engine and/or CQ Service 200 may initially receive information from an input source 202. In one example, the input source 202 may include the data source computers 110 that receive an incoming continuous input data stream that includes a stream of data or events related to the application. In one example, the CQL Engine and/or CQ Service 200 may then identify an input relation 154, which may be a representation of data from the input source 202. In some examples, and as discussed above, the input source 202 may include a bounded set of data records related to an application. In a certain embodiment, when a query (e.g., a continuous query) is identified or received that includes an input relation 154, the CQL engine 200 may parse the query to identify the configurable window operator 156 in the query and execute the query based at least in part on the configurable window operator to generate an output relation 158. In one embodiment, the CQL engine and/or CQ Service 200 may execute the query by applying the configurable window operator on an attribute in the input relation to generate the output relation. In some examples, the output relation may be a representation of data (e.g., a subset of data records) related to the application. The CQL Engine and/or CQ Service 200 may then store the output relation in an output destination 204, such as for example, in the databases 112 shown in FIG. 1.

Figure 3:
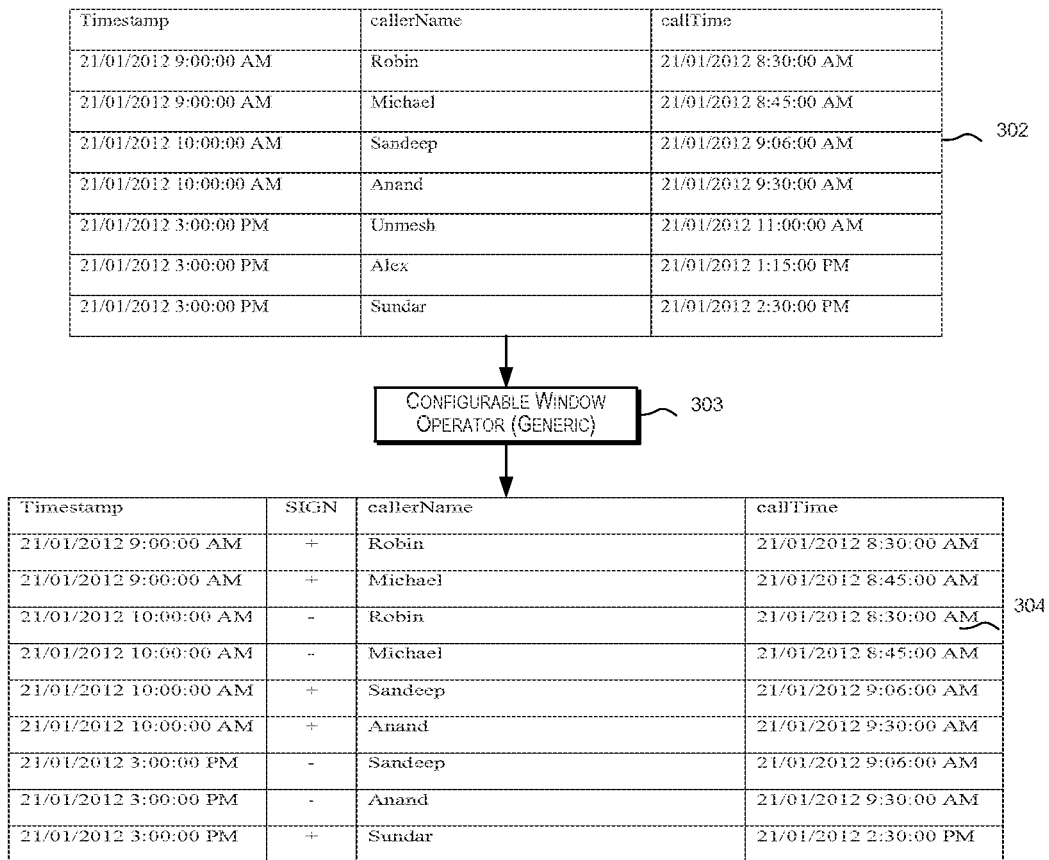
FIG. 3 illustrates exemplary information stored in an input relation and the generation of an output relation when the input relation is processed using a configurable window operator, in accordance with one embodiment of the present disclosure.

FIG. 3 illustrates exemplary information stored in an input relation and the generation of an output relation when the input relation is processed using a configurable window operator, in accordance with one embodiment of the present disclosure. As an example, consider an input relation, "CallCentreRecords" that may be generated as follows:

CREATE RELATION CallCentreRecords (callerName char (50), callTime, timestamp).

Per this definition, the input relation, "CallCentreRecords" contains two attributes, a first attribute "callerName", a second attribute, "callTime" and a timestamp. In one example, the input relation, "CallCentreRecords" may store continuous data streams related to call detail records from a call center. As used herein, a "call center" typically refers to a service network in which customer service representatives may provide services to customers via telephones. Continuous data streams from a call center may typically include call-by-call information related to a call that is summarized over short time-intervals. Such call-by-call information may include, for example, a timestamp for when a call was recorded or received in the database, a caller name, the time that the call was placed, and the like.

Referring to the example shown in FIG. 3, in one embodiment, the input relation, "CallCenterRecords", 302, includes columns identifying for each timestamp at which a data record was inserted into the input relation 302, a "callerName" attribute which identifies the name of the caller who placed the call, and a "callTime" attribute which identifies the date and time that the call was placed.

In certain embodiments, a CQL query may be identified or received that includes the "CallCenterRecords", input relation 302 as follows:

SELECT*FROM CallCentreRecords [RANGE 1 HOUR ON callTime]

As per the CQL query shown above, the configurable window operator is identified as a "generic value" window operator 303. The CQ1 query is then executed based at least in part on the "generic value" window operator 303 by applying the "RANGE 1 HOUR" window operator on the attribute "callTime" in the "CallCenterRecords", input relation 302 to generate an output relation. An output relation, 304, that is generated as a result of applying the "RANGE 1 HOUR" window operator 303 is also shown in FIG. 3.

In one embodiment, and as illustrated in FIG. 3, the output relation 304 includes a subset of data records from the input relation 302, whose attribute value, "callTime", lies in the specified range, "1 HOUR" with respect to the timestamp t of the data records. In the example shown in FIG. 3, in one embodiment, the "CallCenterRecords" output relation 304 also includes a column identifying for each data record, a "SIGN" attribute which indicates whether a particular data record from the input relation 302 was inserted into the output relation 304 or removed from the output relation 304 as a result of applying the "generic value" window operator 303 on the input relation 302. The manner in which the "CallCenterRecords" output relation 304 is generated is discussed in detail below.

Consider the first data record in the "CallCenterRecords" input relation 302. As per the information in the "CallCenterRecords" input relation 302, this record has a timestamp of Jan. 21, 2012 9:00:00 AM and indicates that a call was placed by a caller "Robin" at Jan. 21, 2012 8:30:00 AM. When the "RANGE 1 HOUR" window operator 303 is applied on the "callTime" attribute, it is determined whether the first data record is to be inserted into the CallCenterRecords" output relation 304. In this example, the first data record in the "CallCenterRecords" input relation 302 will be inserted into the "CallCenterRecords" output relation 304 because the call time (8:30:00 AM) of this call was placed within a 1 hour range from the current timestamp of Jan. 21, 2012 9:00:00 AM, wherein the 1 hour range from the current timestamp is defined to be (8.00 AM-9.00 AM) for this data record. In one embodiment, and as illustrated in FIG. 3B, the insertion of this data record into the "CallCenterRecords" output relation 304 is indicated by a + entry in the SIGN column corresponding to the data record.

Similarly, the second data record in the "CallCenterRecords" input relation 302 which indicates that a call was placed by caller "Michael" at Jan. 21, 2012 8:45:00 AM will also be inserted into the "CallCenterRecords" output relation 304 since the call time (8:45:00 AM) of this call was also placed within a 1 hour range from the current timestamp of Jan. 21, 2012 9:00:00 AM, wherein the 1 hour range from the current timestamp is defined to be (8:00:00 AM-9:00:00 AM) for this data record.

The next data record in the "CallCenterRecords" input relation 302 indicates that the current time stamp has now moved to Jan. 21, 2012 10:00:00 AM. It may further be observed that two data records have been inserted into the input relation 302 at the current time stamp of 10:00:00 AM. These records include a caller, "Sandeep" whose call was placed at Jan. 21, 2012, 9:06:00 AM and a caller "Anand" whose call was placed at Jan. 21, 2012 9:30:00 AM. Since, these records lie within the 1 hour range of the current timestamp of Jan. 21, 2012 10:00:00 AM, wherein the 1 hour range from the current timestamp is defined to be (9:00:00 AM-10:00:00 AM) they are also inserted into the "CallCenterRecords" output relation 304 as indicated by the + operator in the SIGN column next to these data records. However, it may be observed that the data records which include callers, "Robin" and "Michael" now no longer lie within the 1 hour range (9:00:00 AM-10:00:00 AM) from the current timestamp. Therefore, these records are removed from the "CallCenterRecords" output relation 304 at the current timestamp of 10:00:00 AM. In one embodiment, and as illustrated in FIG. 3, the deletion of these data records from the "CallCenterRecords" output relation 304 is indicated by a – entry in the SIGN column corresponding to the data records.

Now, the current time stamp has moved to Jan. 21, 2012, 3:00:00 PM. The data records in the "CallCenterRecords" input relation 302 at this time stamp include caller, "Unmesh" whose call was placed at Jan. 21, 2012 11:00:00 AM and caller, "Alex" whose call was placed at Jan. 21, 2012 1:15:00 PM. However, these records are not inserted into the output relation 304 since the call times of these calls were not placed within the 1 hour range of the current timestamp of Jan. 21, 2012, 3:00:00 PM, wherein the 1 hour range from the current timestamp is defined to be (2:00:00 PM-3:00:00 PM). However caller "Sundar" whose call was placed at Jan. 21, 2012 2:30:00 PM is inserted into the "CallCenterRecords" output relation 304 as this call was placed within the 1 hour range of the current timestamp of Jan. 21, 2012, 3:00:00 PM. Similarly, it may be observed that the data records which include callers, "Sandeep" and "Anand" now no longer lie within the 1 hour range from the current timestamp of Jan. 21, 2012, 3:00:00 PM. Therefore, these records are removed from the "CallCenterRecords" output relation 304 as indicated by a – entry in the SIGN column corresponding to the data records.

It is to be appreciated that the information listed in the "CallCenterRecords" input relation 302 and the "CallCenterRecords" output relation 304 is merely provided by way of example and is not intended to limit the scope of the present disclosure. One of ordinary skill in the art would recognize many variations, modifications, and alternatives.

Figure 4:
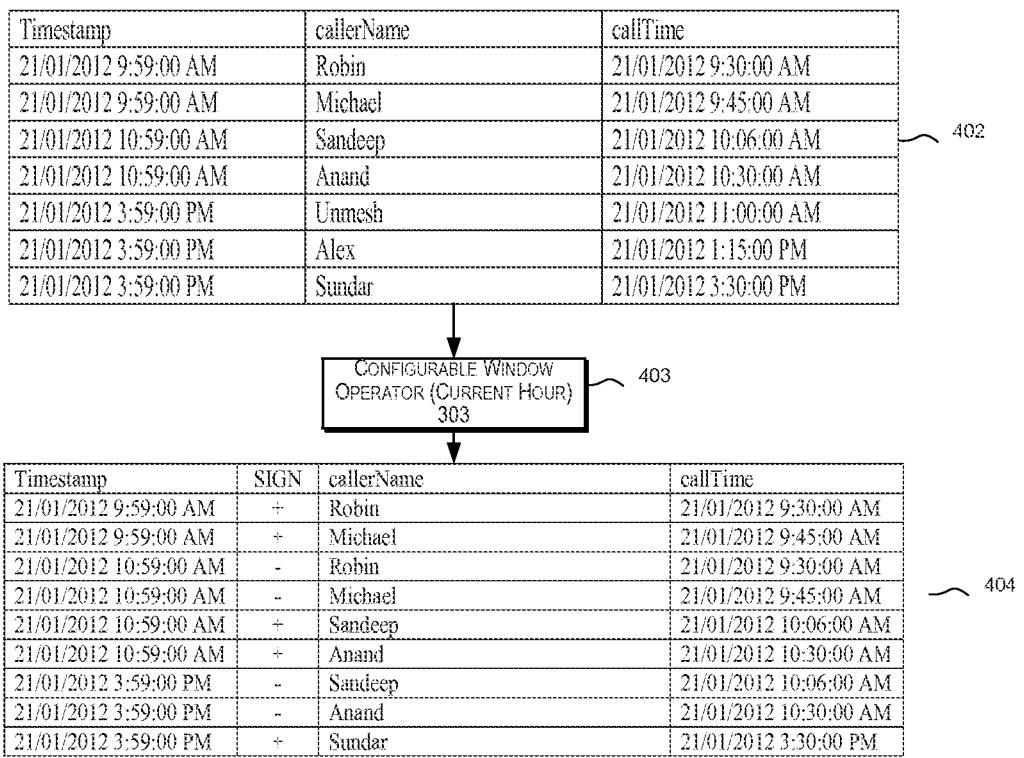
FIG. 4 illustrates exemplary information stored in an input relation and the generation of an output relation when the input relation is processed using a configurable window operator, in accordance with another embodiment of the present disclosure.

FIG. 4 illustrates exemplary information stored in an input relation and the generation of an output relation when the input relation is processed using a configurable window operator, in accordance with another embodiment of the present disclosure. FIG. 4 illustrates exemplary information stored in a "CallCenterRecords" input relation 402, in accordance with one embodiment of the present disclosure. In the example shown in FIG. 4, in one embodiment, the input relation, "CallCenterRecords", 402, includes columns identifying for each timestamp at which a data record was inserted into the input relation, a "callerName" attribute which identifies the name of the caller who placed the call, and a "callTime" attribute which identifies the date and time that the call was placed.

In certain embodiments, a CQL query may be identified or received that includes the "CallCenterRecords", input relation 402 as follows:

SELECT callerName, callTime FROM CallCentreRecords[CurrentHour ON callTime]

As per the CQL query shown above, the configurable window operator is identified as a "current hour" window operator 403. The CQL query is then executed based at least in part on the "current hour" window operator by applying the "CurrentHour" window operator 403 on the attribute "callTime" in the "CallCenterRecords", input relation 402 to generate an output relation. An output relation 404 that is generated as a result of applying the "CurrentHour" window operator 403 is also shown in FIG. 4.

In one embodiment, and as illustrated in FIG. 4, the output relation 404 includes a subset of data records from the input relation 402, whose attribute value, "callTime", lies in the current hour with respect to the timestamp t of the data records. In the example shown in FIG. 4, in one embodiment, the "CallCenterRecords" output relation 404 also includes a column identifying for each data record, a "SIGN" attribute which indicates whether a particular data record from the input relation 402 was inserted into the output relation 404 or removed from the output relation 404 as a result of applying the "CurrentHour" window operator 403 on the input relation 402.

Figure 5:
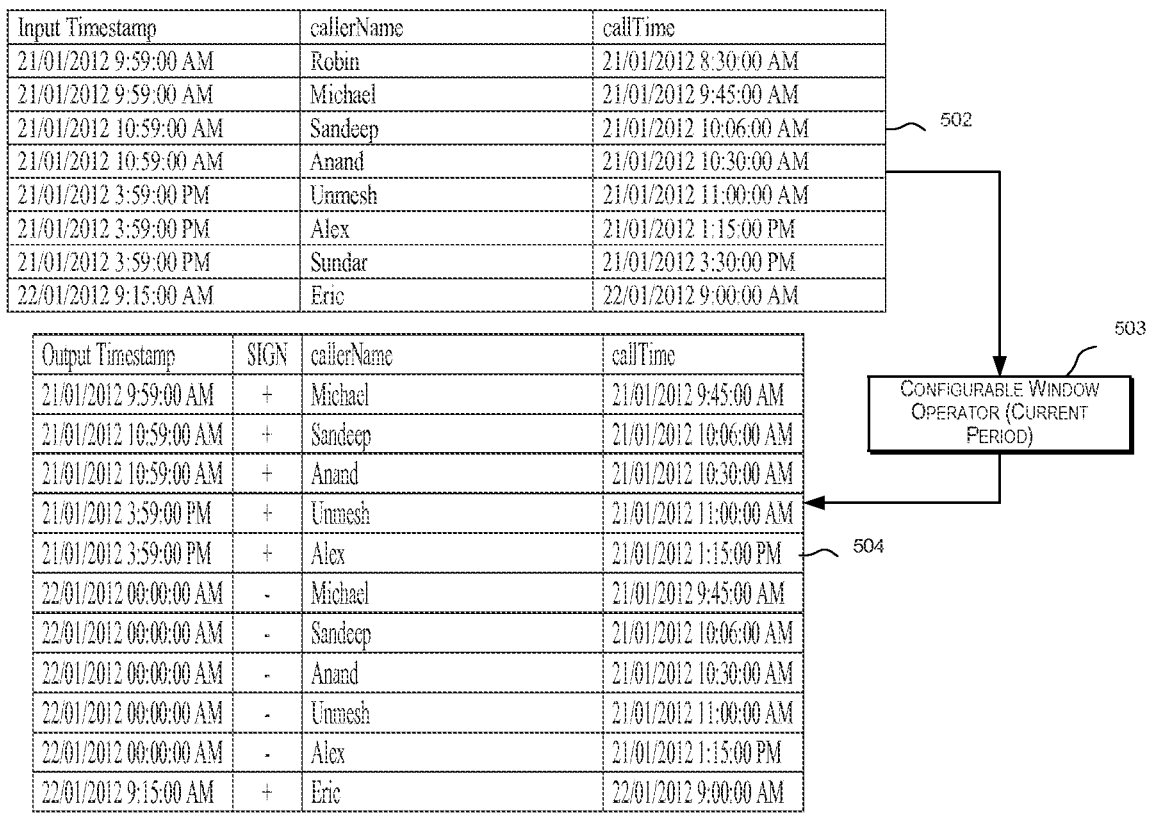
FIG. 5 illustrates exemplary information stored in an input relation and the generation of an output relation when the input relation is processed using a configurable window operator, in accordance with another embodiment of the present disclosure.

FIG. 5 illustrates exemplary information stored in an input relation and the generation of an output relation when the input relation is processed using a configurable window operator, in accordance with another embodiment of the present disclosure. FIG. 5 illustrates exemplary information stored in a "CallCenterRecords" input relation 402, in accordance with one embodiment of the present disclosure. In the example shown in FIG. 5, in one embodiment, the input relation, "CallCenterRecords", 502, includes columns identifying for each timestamp at which a data record was inserted into the input relation, a "callerName" attribute which identifies the name of the caller who placed the call, and a "callTime" attribute which identifies the date and time that the call was placed.

In certain embodiments, a CQL query may be identified or received that includes the "CallCenterRecords", input relation 502 as follows:

SELECT callerName, callTime FROM CallCentreRecords[CurrentPeriod ("0900", "1500" ON callTime]

As per the CQL query shown above, the configurable window operator is identified as a "current period" window operator 503. The CQL query is then executed based at least in part on the "CurrentPeriod" window operator 503 by applying the "CurrentPeriod" window operator 503 on the attribute "callTime" in the "CallCenterRecords", input relation 502 to generate an output relation. An output relation 504 that is generated as a result of applying the "CurrentPeriod" window operator 503 is also shown in FIG. 5.

In one embodiment, and as illustrated in FIG. 5, the output relation 504 may include a subset of data records from the input relation 502, whose attribute value, "callTime", lies in the current period, CurrentPeriod ("0900", "1500") with respect to the timestamp t of the data records. In the example shown in FIG. 5, in one embodiment, the "CallCenterRecords" output relation 504 also includes a column identifying for each data record, a "SIGN" attribute which indicates whether a particular data record from the input relation 502 was inserted into the output relation 504 or removed from the output relation 504 as a result of applying the CurrentPeriod ("0900", "1500") window operator 503 on the input relation 502.

Figure 6:
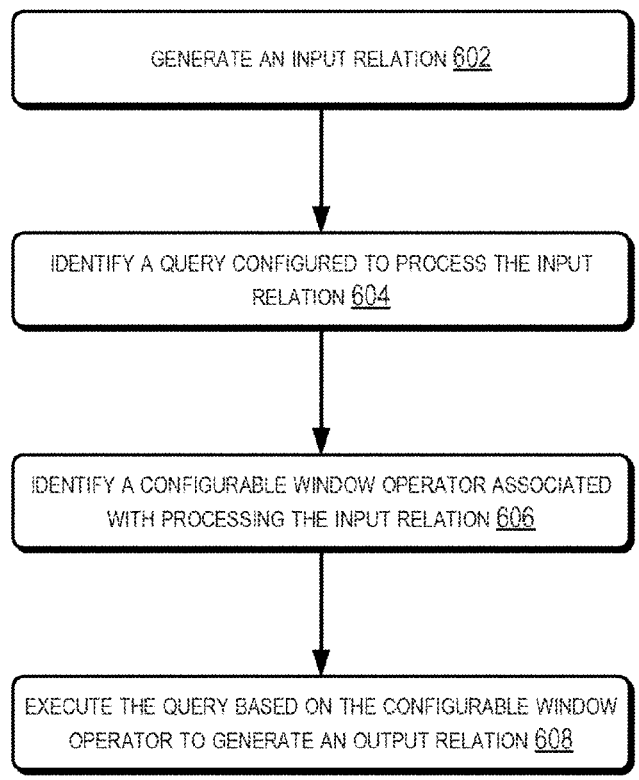
FIG. 6 is a simplified process flow illustrating at least some features of the management of value-based windows on relations described herein, according to at least one example.
Figure 7:
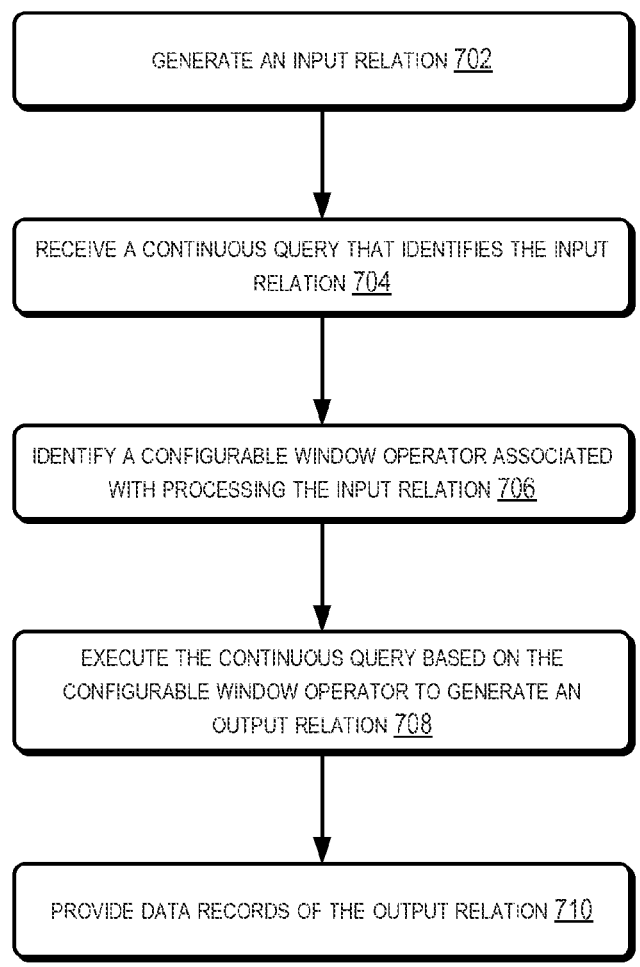
FIG. 7 is another simplified process flow illustrating at least some features of the management of value-based windows on relations described herein, according to at least one example.

FIGS. 6-7 illustrate example flow diagrams showing respective processes 600 and 700 for implementing the management of value-based windows on relations described herein. These processes 600 and 700 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the input relation module 148, the configurable window operator module 150 or the output relation module 152) shown in at least FIG. 1 (and others) may perform the process 600 of FIG. 6. The process 600 may begin at 602 by including generating an input relation. At 604, the process 600 may include identifying a query (e.g., a CQL query) to process the input relation. At 606, the process 600 may include identifying a configurable window operator associated with processing the input relation. Further, in some examples, the process 600 may end at 608 by including executing the query based at least in part on the configurable window operator to generate an output relation.

FIG. 7 illustrates an example flow diagram showing process 700 for implementing the management of value-based windows on relations described herein. The one or more service provider computers 106 (e.g., utilizing at least the input relation module 148, the configurable window operator module 150 or the output relation module 152) shown in at least FIG. 1 (and others) may perform the process 700 of FIG. 7. The process 700 may begin at 702 by including generating an input relation. In one embodiment, the input relation is a bounded set of data records related to an application. At 704, the process 700 may include receiving a continuous query (e.g., a CQL query) that identifies the input relation. At 706, the process 700 may include identifying a configurable window operator associated with processing the input relation. Further, in some examples, the process 700 may include executing the continuous query based at least in part on the configurable window operator to generate an output relation at 708. Further, the process 700 may end, at 710, by including providing the data records of the output relation based at least in part on execution of the continuous query.

Figure 8:
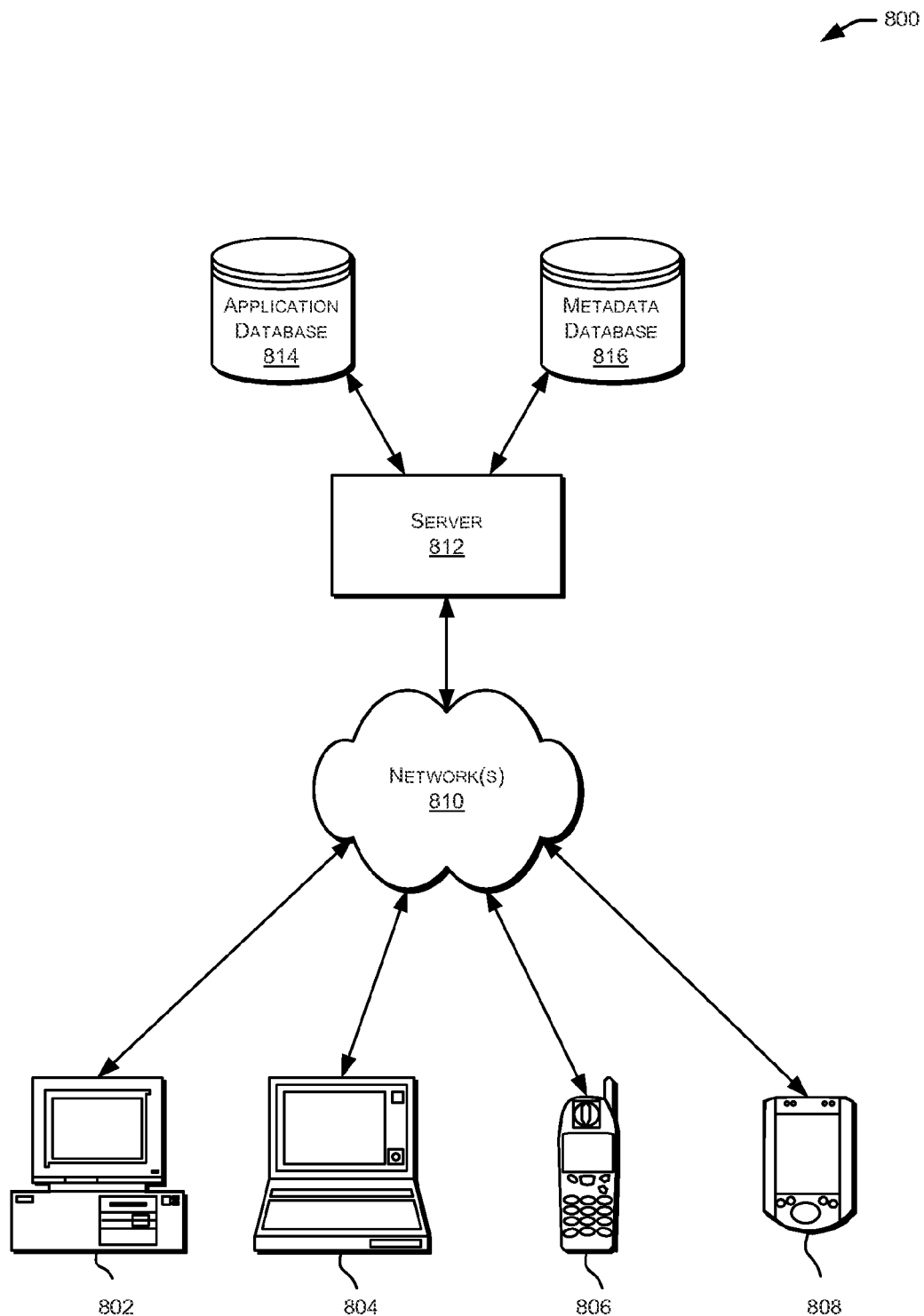
FIG. 8 is a simplified block diagram illustrating components of a system environment that may be used in accordance with an embodiment of the management of value-based windows on relations described herein, according to at least one example.

FIG. 8 is a simplified block diagram illustrating components of a system environment 800 that may be used in accordance with an embodiment of the present disclosure. As shown, system environment 800 includes one or more client computing devices 802, 804, 806, 808, which are configured to operate a client application such as a web browser, proprietary client (e.g., Oracle Forms), or the like over one or more networks 810 (such as, but not limited to, networks similar to the networks 108 of FIG. 1). In various embodiments, client computing devices 802, 804, 806, and 808 may interact with a server 812 over the networks 810.

Client computing devices 802, 804, 806, and 808 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 802, 804, 806, and 808 may be any other electronic device, such as a thin-client computer, Internet-enabled gaming system, and/or personal messaging device, capable of communicating over a network (e.g., network 810 described below). Although exemplary system environment 800 is shown with four client computing devices, any number of client computing devices may be supported. Other devices such as devices with sensors, etc. may interact with server 812.

System environment 800 may include networks 810. Networks 810 may be any type of network familiar to those skilled in the art that can support data communications using any of a variety of commercially-available protocols, including without limitation TCP/IP, SNA, IPX, AppleTalk, and the like. Merely by way of example, network 1510 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 800 also includes one or more server computers 812 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 800 may also include one or more databases 814, 816. Databases 814, 816 may reside in a variety of locations. By way of example, one or more of databases 814, 816 may reside on a non-transitory storage medium local to (and/or resident in) server 812. Alternatively, databases 814, 816 may be remote from server 812, and in communication with server 812 via a network-based or dedicated connection. In one set of embodiments, databases 814, 816 may reside in a storage-area network (SAN) familiar to those skilled in the art. Similarly, any necessary files for performing the functions attributed to server 812 may be stored locally on server 812 and/or remotely, as appropriate. In one set of embodiments, databases 814, 816 may include relational databases, such as databases provided by Oracle, that are adapted to store, update, and retrieve data in response to SQL-formatted commands.

Figure 9:
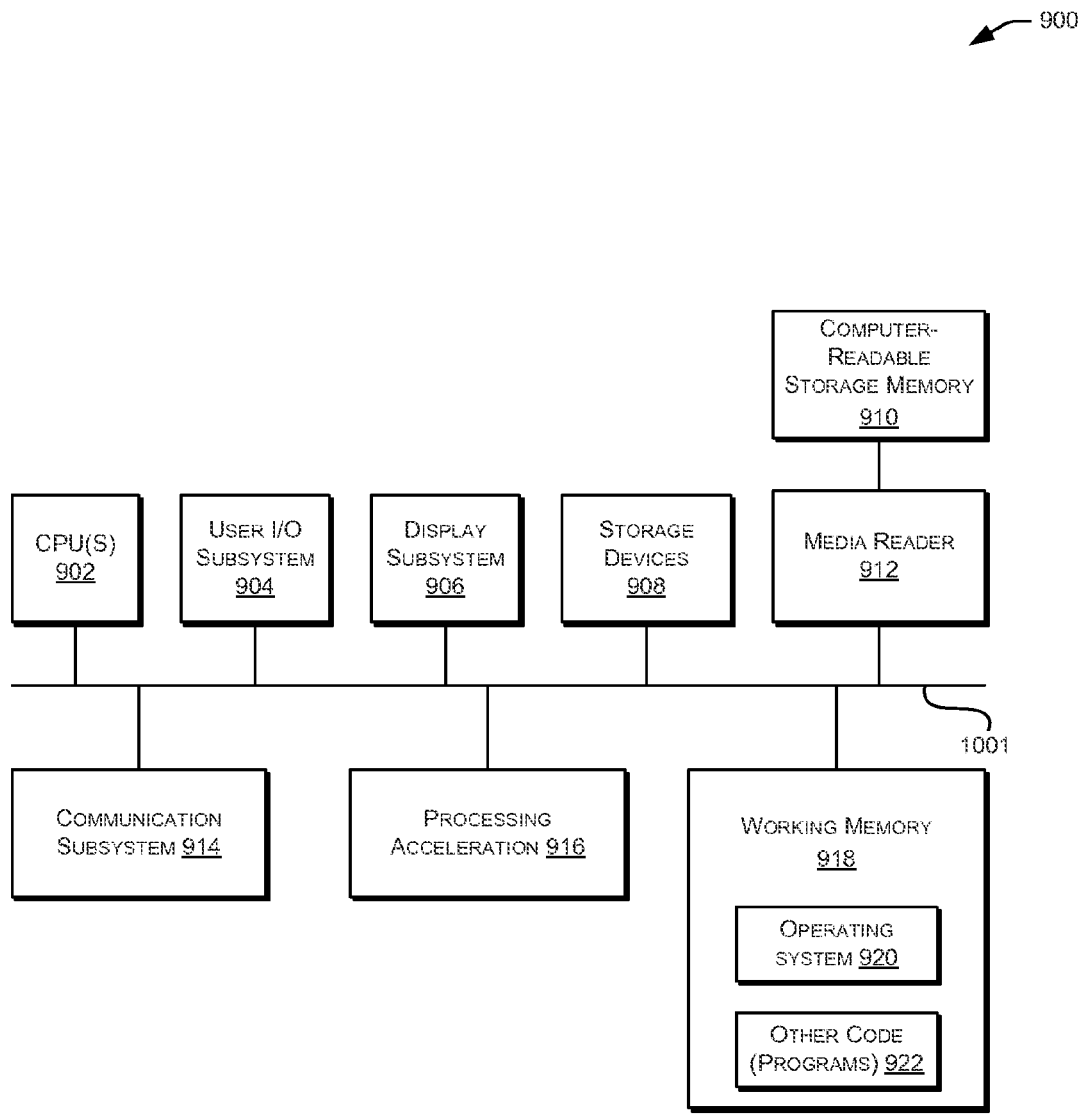
FIG. 9 is a simplified block diagram illustrating a computer system that may be used in accordance with embodiments of the management of value-based windows on relations described herein described herein, according to at least one example.

FIG. 9 is a simplified block diagram of a computer system 900 that may be used in accordance with embodiments of the present disclosure. For example service provider computers 106 may be implemented using a system such as system 900. Computer system 900 is shown comprising hardware elements that may be electrically and/or communicatively coupled via a bus 901. The hardware elements may include one or more central processing units (CPUs) 902, one or more input devices 904 (e.g., a mouse, a keyboard, etc.), and one or more output devices 906 (e.g., a display device, a printer, etc.). Computer system 900 may also include one or more storage devices 908. By way of example, the storage device(s) 908 may include devices such as disk drives, optical storage devices, and solid-state storage devices such as a random access memory (RAM) and/or a read-only memory (ROM), which can be programmable, flash-updateable and/or the like.

Computer system 900 may additionally include a computer-readable storage media reader 912, a communications subsystem 914 (e.g., a modem, a network card (wireless or wired), an infra-red communication device, etc.), and working memory 918, which may include RAM and ROM devices as described above. In some embodiments, computer system 900 may also include a processing acceleration unit 916, which can include a digital signal processor (DSP), a special-purpose processor, and/or the like.

Computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 may permit data to be exchanged with network 912 and/or any other computer described above with respect to system environment 900.

Computer system 900 may also comprise software elements, shown as being currently located within working memory 918, including an operating system 920 and/or other code 922, such as an application program (which may be a client application, Web browser, mid-tier application, RDBMS, etc.). In an exemplary embodiment, working memory 918 may include executable code and associated data structures used for relying party and open authorizationrelated processing as described above. It should be appreciated that alternative embodiments of computer system 900 may have numerous variations from that described above. For example, customized hardware might also be used and/or particular elements might be implemented in hardware, software (including portable software, such as applets), or both. Further, connection to other computing devices such as network input/output devices may be employed.

Figure 10:
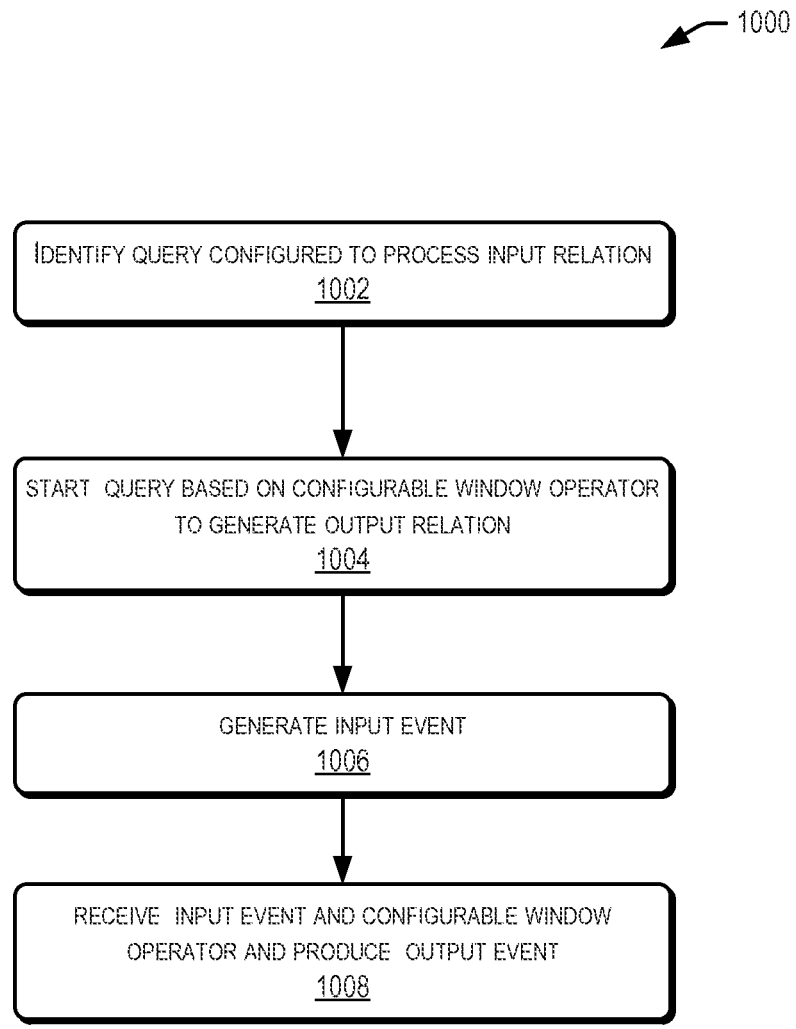
FIG. 10 illustrates an example flow diagram showing a process for implementing the management of value-based windows on relations described herein, in accordance with another embodiment of the present invention.

FIG. 10 illustrates an example flow diagram showing process 1000 for implementing the management of value-based windows on relations described herein, in accordance with another embodiment of the present invention. The one or more service provider computers 106 (e.g., utilizing at least the input relation module 148, the configurable window operator module 150 or the output relation module 152) shown in at least FIG. 1 (and others) may perform the process 1000 of FIG. 10. The process 1000 may begin at 1002 by including identifying a query (e.g., a continuous query) configured to process an input relation. At 1004, the process 1000 may include starting the query based on a configurable window operator to generate an output relation. At 1006, the process 1000 may include generating an input event and sending it to the CQL Engine and/or CQ Service 200. In some examples, the input event may be generated when a new event is received at the CQL Engine and/or CQ Service 200. For example, an input event may include a new call placed by a caller in the "CallCentreRecords" input relation 302 discussed above. At 1008, the process 1000 may include receiving the input event and the configurable window operator and producing an output event. The output event may include, for example, a data record that is inserted into the "CallCenterRecords" output relation 304 when the configurable window operator is applied on the "calltime" attribute in the "CallCenterRecords", input relation 302.

Storage media and computer readable media for containing code, or portions of code, can include any appropriate media known or used in the art, including storage media and communication media, such as but not limited to, volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-10 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
receiving a continuous input data stream related to an application;
generating an input relation from the continuous input data stream, the input relation being a bounded set of data records of the continuous input data stream;
storing the input relation as an external data source in a database of historical data;
receiving a continuous query that identifies the input relation and a range value window operator associated with the input relation;
executing the continuous query to generate an output relation, the continuous query executed by applying the range value window operator on an attribute of the input relation to generate the output relation, the attribute comprising a characteristic of an event associated with the input relation;
determining whether the event associated with the input relation occurs within a specified time range defined by the range value window operator;
inserting or removing the event with respect to the output relation based at least in part on the determination of whether the event associated with the input relation occurs within the specified time range; and
providing data records of the output relation, the output relation comprising at least the event when the event was inserted based at least in part on being within the specified range defined by the range value window operator.

2. The computer-implemented method of claim 1, wherein the input relation is generated based at least in part on information related to the application.

3. The computer-implemented method of claim 1, wherein the input relation is an external data source generated based at least in part on one or more archived relations related to the application.

4. The computer-implemented method of claim 1, wherein executing the query further comprises applying the range value window operator on a range window of the input relation to generate the output relation.

5. The computer-implemented method of claim 4, wherein providing the data records comprises displaying the output relation, wherein the output relation comprises a subset of the data records from the input relation whose attribute values lie within a specified range defined by the range value window operator.

6. The computer-implemented method of claim 1, further comprising identifying a current hour value window operator for processing the input relation and processing the data of the input relation based on the current hour value window operator to generate the output relation.

7. The computer-implemented method of claim 1, further comprising identifying a current period value window operator for processing the input relation and processing the data of the input relation based on the current period value operator to generate the output relation.

8. A non-transitory computer-readable memory storing a plurality of instructions executable by one or more processors, the plurality of instructions comprising:
 instructions that cause the one or more processors to receive a continuous input data stream related to an application;
 instructions that cause the one or more processors to generate an input relation from the continuous input data stream;
 instructions that cause the one or more processors to store the input relation as an external data source in a database of historical data;
 instructions that cause the one or more processors to receive a continuous query that identifies the input relation and a range value window operator associated with the input relation;
 instructions that cause the one or more processors to execute the continuous query to generate an output relation, the continuous query executed by applying the range value window operator on an attribute of the input relation to generate the output relation, the attribute comprising a characteristic of an event associated with the input relation;
 instructions that cause the one or more processors to determine whether the event associated with the input relation occurs within a specified time range defined by the range value window operator;
 instructions that cause the one or more processors to determine inserting or removing the event with respect to the output relation based at least in part on the determination of whether the event associated with the input relation occurs within the specified time range; and
 instructions that cause the one or more processors to provide data records of the output relation, the output relation comprising at least the event when the event was inserted based at least in part on being within the specified range defined by the range value window operator.

9. The computer-readable memory of claim 8, wherein the input relation is generated based at least in part on information related to the application.

10. The computer-readable memory of claim 8, wherein the input relation is an external data source generated based at least in part on one or more archived relations related to the application.

11. The computer-readable memory of claim 8, wherein the instructions that cause the one or more processors to execute the continuous query further comprise instructions for applying the range value window operator on a range window of the input relation to generate the output relation.

12. The computer-readable memory of claim 11, further comprising instructions that cause the one or more processors to display the output relation, wherein the output relation comprises a subset of the data records from the input relation whose attribute values lie within a specified range defined by the range value window operator.

13. The computer-readable memory of claim 8, further comprising instructions that cause the one or more processors to provide the data records of the output relation based at least in part on processing the data of the input relation.

14. A system, comprising:
 a memory storing a plurality of instructions; and
 one or more processors configured to access the memory, wherein the one or more processors are further configured to execute the plurality of instructions to at least:
  generate an input relation from a continuous input data stream;
  store the input relation as an external data source in a database of historical data;
  receive a continuous query that identifies the input relation and a range value window operator associated with the input relation;
  execute the continuous query to generate an output relation, the continuous query executed by applying the range value window operator on an attribute of the input relation to generate the output relation, the attribute comprising a characteristic of an event associated with the input relation;
  determine whether the event associated with the input relation occurs within a specified time range defined by the range value window operator;
  insert or remove the event with respect to the output relation based at least in part on the determination of whether the event associated with the input relation occurs within the specified time range; and
  provide data records of the output relation, the output relation comprising at least the event when the event was inserted based at least in part on being within the specified range defined by the range value window operator.

15. The system of claim 14, wherein the one or more processors are further configured to identify a current period value window operator for processing the input relation and process the data of the input relation based on the current period value operator.

16. The system of claim 14, wherein the one or more processors are further configured to execute the plurality of instructions to provide data records of the output relation based at least in part on processing the data of the input relation.

17. The system of claim 14, wherein the one or more processors are further configured to display the output relation, wherein the output relation comprises a subset of the data records from the input relation whose attribute values lie within a specified range defined by the range window.

* * * * *